(12) United States Patent
Lu et al.

(10) Patent No.: US 8,542,264 B2
(45) Date of Patent: Sep. 24, 2013

(54) SYSTEM AND METHOD FOR MANAGING OPTICS IN A VIDEO ENVIRONMENT

(75) Inventors: Torence Lu, Fremont, CA (US); Monica Shen Knotts, San Jose, CA (US); Ashok T. Desai, Fremont, CA (US); Richard T. Wales, Sunnyvale, CA (US); Jacobus M. Berkhout, Menlo Park, CA (US); Michael C. Makay, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 237 days.

(21) Appl. No.: 12/949,614

(22) Filed: Nov. 18, 2010

(65) Prior Publication Data

US 2012/0127257 A1    May 24, 2012

(51) Int. Cl.
*H04N 7/15*    (2006.01)
(52) U.S. Cl.
USPC ............... 348/14.08; 348/14.12; 348/14.09
(58) Field of Classification Search
USPC ............... 348/14.01–14.16; 370/260–261; 709/204–205
See application file for complete search history.

(56) References Cited

U.S. PATENT DOCUMENTS

| | | |
|---|---|---|
| 2,911,462 A | 11/1959 | Brady |
| D212,798 S | 11/1968 | Dreyfuss |
| 3,793,489 A | 2/1974 | Sank |
| 3,909,121 A | 9/1975 | De Mesquita Cardoso |
| D270,271 S | 8/1983 | Steele |
| 4,400,724 A | 8/1983 | Fields |
| 4,473,285 A | 9/1984 | Winter |
| 4,494,144 A | 1/1985 | Brown |
| 4,750,123 A | 6/1988 | Christian |
| 4,815,132 A | 3/1989 | Minami |
| 4,827,253 A | 5/1989 | Maltz |
| 4,853,764 A | 8/1989 | Sutter |
| 4,890,314 A | 12/1989 | Judd et al. |
| 4,961,211 A | 10/1990 | Tsugane et al. |
| 4,994,912 A | 2/1991 | Lumelsky et al. |
| 5,003,532 A | 3/1991 | Ashida et al. |
| 5,020,098 A | 5/1991 | Celli |
| 5,033,969 A | 7/1991 | Kamimura |
| 5,136,652 A | 8/1992 | Jibbe et al. |

(Continued)

FOREIGN PATENT DOCUMENTS

| | | |
|---|---|---|
| CN | 101953158 A | 1/2011 |
| CN | 102067593 | 5/2011 |

(Continued)

OTHER PUBLICATIONS

Design U.S. Appl. No. 29/358,006, filed Mar. 21, 2010, entitled "Mounted Video Unit," Inventor(s): Ashok T. Desai et al.

(Continued)

*Primary Examiner* — Melur Ramakrishnaiah
(74) *Attorney, Agent, or Firm* — Patent Capital Group

(57) ABSTRACT

An apparatus is provided in one example and includes a camera configured to receive image data associated with an end user involved in a video session. The apparatus further includes a display configured to interface with the camera. The camera and the display cooperate such that the apparatus can initiate the video session involving the end user, and activate a retracting mechanism configured to move the camera such that the camera is retracted from a view of the display and the camera moves to an inactive state.

18 Claims, 9 Drawing Sheets

(56) References Cited

U.S. PATENT DOCUMENTS

| | | |
|---|---|---|
| 5,187,571 A | 2/1993 | Braun et al. |
| 5,200,818 A | 4/1993 | Neta et al. |
| 5,243,697 A | 9/1993 | Hoeber et al. |
| 5,249,035 A | 9/1993 | Yamanaka |
| 5,255,211 A | 10/1993 | Redmond |
| D341,848 S | 11/1993 | Bigelow et al. |
| 5,268,734 A | 12/1993 | Parker et al. |
| 5,317,405 A | 5/1994 | Kuriki et al. |
| 5,337,363 A | 8/1994 | Platt |
| 5,347,363 A | 9/1994 | Yamanaka |
| 5,351,067 A | 9/1994 | Lumelsky et al. |
| 5,359,362 A | 10/1994 | Lewis et al. |
| D357,468 S | 4/1995 | Rodd |
| 5,406,326 A | 4/1995 | Mowry |
| 5,423,554 A | 6/1995 | Davis |
| 5,446,834 A | 8/1995 | Deering |
| 5,448,287 A | 9/1995 | Hull |
| 5,467,401 A | 11/1995 | Nagamitsu et al. |
| 5,495,576 A | 2/1996 | Ritchey |
| 5,502,481 A | 3/1996 | Dentinger et al. |
| 5,502,726 A | 3/1996 | Fischer |
| 5,506,604 A | 4/1996 | Nally et al. |
| 5,532,737 A | 7/1996 | Braun |
| 5,541,639 A | 7/1996 | Takatsuki et al. |
| 5,541,773 A | 7/1996 | Kamo et al. |
| 5,570,372 A | 10/1996 | Shaffer |
| 5,572,248 A | 11/1996 | Allen et al. |
| 5,587,726 A | 12/1996 | Moffat |
| 5,625,410 A | 4/1997 | Washino et al. |
| 5,666,153 A | 9/1997 | Copeland |
| 5,673,401 A | 9/1997 | Volk et al. |
| 5,675,374 A | 10/1997 | Kohda |
| 5,689,663 A | 11/1997 | Williams |
| 5,708,787 A | 1/1998 | Nakano et al. |
| 5,713,033 A | 1/1998 | Sado |
| 5,715,377 A | 2/1998 | Fukushima et al. |
| D391,558 S | 3/1998 | Marshall et al. |
| D391,935 S | 3/1998 | Sakaguchi et al. |
| D392,269 S | 3/1998 | Mason et al. |
| 5,729,471 A | 3/1998 | Jain et al. |
| 5,737,011 A | 4/1998 | Lukacs |
| 5,745,116 A | 4/1998 | Pisutha-Arnond |
| 5,748,121 A | 5/1998 | Romriell |
| D395,292 S | 6/1998 | Vu |
| 5,760,826 A | 6/1998 | Nayar |
| D396,455 S | 7/1998 | Bier |
| D396,456 S | 7/1998 | Bier |
| 5,790,182 A | 8/1998 | St. Hilaire |
| 5,796,724 A | 8/1998 | Rajamani et al. |
| D397,687 S | 9/1998 | Arora et al. |
| D398,595 S | 9/1998 | Baer et al. |
| 5,815,196 A | 9/1998 | Alshawi |
| D399,501 S | 10/1998 | Arora et al. |
| 5,818,514 A | 10/1998 | Duttweiler et al. |
| 5,821,985 A | 10/1998 | Iizawa |
| 5,825,362 A | 10/1998 | Retter |
| D406,124 S | 2/1999 | Newton et al. |
| 5,889,499 A | 3/1999 | Nally et al. |
| 5,894,321 A | 4/1999 | Downs et al. |
| D409,243 S | 5/1999 | Lonergan |
| D410,447 S | 6/1999 | Chang |
| 5,929,857 A | 7/1999 | Dinallo et al. |
| 5,940,118 A | 8/1999 | Van Schyndel |
| 5,940,530 A | 8/1999 | Fukushima et al. |
| 5,953,052 A | 9/1999 | McNelley et al. |
| 5,956,100 A | 9/1999 | Gorski |
| 5,996,003 A | 11/1999 | Namikata et al. |
| D419,543 S | 1/2000 | Warren et al. |
| D420,995 S | 2/2000 | Imamura et al. |
| 6,069,648 A | 5/2000 | Suso et al. |
| 6,069,658 A | 5/2000 | Watanabe |
| 6,088,045 A | 7/2000 | Lumelsky et al. |
| 6,097,390 A | 8/2000 | Marks |
| 6,101,113 A | 8/2000 | Paice |
| 6,124,896 A | 9/2000 | Kurashige |
| 6,137,485 A | 10/2000 | Kawai et al. |
| 6,148,092 A | 11/2000 | Qian |
| D435,561 S | 12/2000 | Pettigrew et al. |
| 6,167,162 A | 12/2000 | Jacquin et al. |
| 6,172,703 B1 | 1/2001 | Lee |
| 6,173,069 B1 | 1/2001 | Daly et al. |
| D438,873 S | 3/2001 | Wang et al. |
| D440,575 S | 4/2001 | Wang et al. |
| 6,211,870 B1 | 4/2001 | Foster |
| 6,226,035 B1 | 5/2001 | Korein et al. |
| 6,243,130 B1 | 6/2001 | McNelley et al. |
| 6,249,318 B1 | 6/2001 | Girod et al. |
| 6,256,400 B1 | 7/2001 | Takata et al. |
| 6,259,469 B1 | 7/2001 | Ejima et al. |
| 6,266,082 B1 | 7/2001 | Yonezawa et al. |
| 6,266,098 B1 | 7/2001 | Cove et al. |
| D446,790 S | 8/2001 | Wang et al. |
| 6,285,392 B1 | 9/2001 | Satoda et al. |
| 6,292,188 B1 | 9/2001 | Carlson et al. |
| 6,292,575 B1 | 9/2001 | Bortolussi et al. |
| D450,323 S | 11/2001 | Moore et al. |
| D453,167 S | 1/2002 | Hasegawa et al. |
| D454,574 S | 3/2002 | Wasko et al. |
| 6,356,589 B1 | 3/2002 | Gebler et al. |
| 6,380,539 B1 | 4/2002 | Edgar |
| 6,396,514 B1 | 5/2002 | Kohno |
| 6,424,377 B1 | 7/2002 | Driscoll, Jr. |
| D461,191 S | 8/2002 | Hickey et al. |
| 6,430,222 B1 | 8/2002 | Okada |
| 6,459,451 B2 | 10/2002 | Driscoll et al. |
| 6,462,767 B1 | 10/2002 | Obata et al. |
| 6,493,032 B1 | 12/2002 | Wallerstein et al. |
| D468,322 S | 1/2003 | Walker et al. |
| 6,507,356 B1 | 1/2003 | Jackel et al. |
| D470,153 S | 2/2003 | Billmaier et al. |
| 6,515,695 B1 | 2/2003 | Sato et al. |
| D474,194 S | 5/2003 | Kates et al. |
| 6,573,904 B1 | 6/2003 | Chun et al. |
| 6,577,333 B2 | 6/2003 | Tai et al. |
| 6,583,808 B2 | 6/2003 | Boulanger et al. |
| 6,590,603 B2 | 7/2003 | Sheldon et al. |
| 6,591,314 B1 | 7/2003 | Colbath |
| 6,593,955 B1 | 7/2003 | Falcon |
| 6,593,956 B1 | 7/2003 | Potts et al. |
| D478,090 S | 8/2003 | Nguyen et al. |
| D478,912 S | 8/2003 | Johnson |
| 6,611,281 B2 | 8/2003 | Strubbe |
| D482,368 S | 11/2003 | den Toonder et al. |
| 6,680,856 B2 | 1/2004 | Schreiber |
| 6,693,663 B1 | 2/2004 | Harris |
| 6,694,094 B2 | 2/2004 | Partynski et al. |
| 6,704,048 B1 | 3/2004 | Malkin et al. |
| 6,710,797 B1 | 3/2004 | McNelley et al. |
| 6,751,106 B2 | 6/2004 | Zhang et al. |
| D492,692 S | 7/2004 | Fallon et al. |
| 6,763,226 B1 | 7/2004 | McZeal |
| 6,768,722 B1 | 7/2004 | Katseff et al. |
| D494,186 S | 8/2004 | Johnson |
| 6,771,303 B2 | 8/2004 | Zhang et al. |
| 6,774,927 B1 | 8/2004 | Cohen et al. |
| D495,715 S | 9/2004 | Gildred |
| 6,795,108 B2 | 9/2004 | Jarboe et al. |
| 6,795,558 B2 | 9/2004 | Matsuo et al. |
| 6,798,834 B1 | 9/2004 | Murakami et al. |
| 6,806,898 B1 | 10/2004 | Toyama et al. |
| 6,807,280 B1 | 10/2004 | Stroud et al. |
| 6,809,724 B1 | 10/2004 | Shiraishi et al. |
| 6,831,653 B2 | 12/2004 | Kehlet et al. |
| 6,844,990 B2 | 1/2005 | Artonne et al. |
| 6,853,398 B2 | 2/2005 | Malzbender et al. |
| 6,867,798 B1 * | 3/2005 | Wada et al. .................. 348/143 |
| 6,882,358 B1 | 4/2005 | Schuster et al. |
| 6,888,358 B2 | 5/2005 | Lechner et al. |
| D506,208 S | 6/2005 | Jewitt et al. |
| 6,909,438 B1 | 6/2005 | White et al. |
| 6,911,995 B2 | 6/2005 | Ivanov et al. |
| 6,917,271 B2 | 7/2005 | Zhang et al. |
| 6,922,718 B2 | 7/2005 | Chang |
| 6,925,613 B2 | 8/2005 | Gibson |

| | | |
|---|---|---|
| 6,963,653 B1 | 11/2005 | Miles |
| D512,723 S | 12/2005 | Wirz |
| 6,980,526 B2 | 12/2005 | Jang et al. |
| 6,989,754 B2 | 1/2006 | Kisacanin et al. |
| 6,989,836 B2 | 1/2006 | Ramsey |
| 6,989,856 B2 | 1/2006 | Firestone et al. |
| 6,990,086 B1 | 1/2006 | Holur et al. |
| 7,002,973 B2 | 2/2006 | MeLampy et al. |
| 7,028,092 B2 | 4/2006 | MeLampy et al. |
| 7,030,890 B1 | 4/2006 | Jouet et al. |
| 7,031,311 B2 | 4/2006 | MeLampy et al. |
| 7,036,092 B2 | 4/2006 | Sloo et al. |
| D521,521 S | 5/2006 | Jewitt et al. |
| 7,043,528 B2 | 5/2006 | Schmitt et al. |
| 7,046,862 B2 | 5/2006 | Ishizaka et al. |
| D522,559 S | 6/2006 | Naito et al. |
| 7,057,636 B1 | 6/2006 | Cohen-Solal et al. |
| 7,057,662 B2 | 6/2006 | Malzbender |
| 7,058,690 B2 | 6/2006 | Maehiro |
| 7,061,896 B2 | 6/2006 | Jabbari et al. |
| D524,321 S | 7/2006 | Hally et al. |
| 7,072,504 B2 | 7/2006 | Miyano et al. |
| 7,080,157 B2 | 7/2006 | McCanne |
| 7,092,002 B2 | 8/2006 | Ferren et al. |
| 7,111,045 B2 | 9/2006 | Kato et al. |
| 7,131,135 B1 | 10/2006 | Virag et al. |
| 7,136,651 B2 | 11/2006 | Kalavade |
| 7,139,767 B1 | 11/2006 | Taylor et al. |
| D533,525 S | 12/2006 | Arie |
| D533,852 S | 12/2006 | Ma |
| D534,511 S | 1/2007 | Maeda et al. |
| D535,954 S | 1/2007 | Hwang et al. |
| D536,001 S | 1/2007 | Armstrong et al. |
| 7,158,674 B2 | 1/2007 | Suh |
| 7,161,942 B2 | 1/2007 | Chen et al. |
| 7,164,435 B2 | 1/2007 | Wang et al. |
| D536,340 S | 2/2007 | Jost et al. |
| D539,243 S | 3/2007 | Chiu et al. |
| D540,336 S | 4/2007 | Kim et al. |
| D541,773 S | 5/2007 | Chong et a |
| D542,247 S | 5/2007 | Kinoshita et al. |
| D544,494 S | 6/2007 | Cummins |
| D545,314 S | 6/2007 | Kim |
| D547,320 S | 7/2007 | Kim et al. |
| 7,239,338 B2 | 7/2007 | Krisbergh et al. |
| 7,246,118 B2 | 7/2007 | Chastain et al. |
| D548,742 S | 8/2007 | Fletcher |
| 7,254,785 B2 | 8/2007 | Reed |
| D550,635 S | 9/2007 | DeMaio et al. |
| D551,184 S | 9/2007 | Kanou et al. |
| D551,672 S | 9/2007 | Wirz |
| 7,269,292 B2 | 9/2007 | Steinberg |
| 7,274,555 B2 | 9/2007 | Kim et al. |
| D554,664 S | 11/2007 | Van Dongen et al. |
| D555,610 S | 11/2007 | Yang et al. |
| D559,265 S | 1/2008 | Armstrong et al. |
| D560,225 S | 1/2008 | Park et al. |
| D560,681 S | 1/2008 | Fletcher |
| D561,130 S | 2/2008 | Won et al. |
| 7,336,299 B2 | 2/2008 | Kostrzewski |
| D563,965 S | 3/2008 | Van Dongen et al. |
| D564,530 S | 3/2008 | Kim et al. |
| D567,202 S | 4/2008 | Rieu Piquet |
| 7,352,809 B2 | 4/2008 | Wenger et al. |
| 7,353,279 B2 | 4/2008 | Durvasula et al. |
| 7,353,462 B2 | 4/2008 | Caffarelli |
| 7,359,731 B2 | 4/2008 | Choksi |
| 7,399,095 B2 | 7/2008 | Rondinelli |
| D574,392 S | 8/2008 | Kwag et al. |
| 7,411,975 B1 | 8/2008 | Mohaban |
| 7,413,150 B1 | 8/2008 | Hsu |
| 7,428,000 B2 | 9/2008 | Cutler et al. |
| D578,496 S | 10/2008 | Leonard |
| 7,440,615 B2 | 10/2008 | Gong et al. |
| D580,451 S | 11/2008 | Steele et al. |
| 7,471,320 B2 | 12/2008 | Malkin et al. |
| D585,453 S | 1/2009 | Chen et al. |
| 7,477,322 B2 | 1/2009 | Hsieh |
| 7,477,657 B1 | 1/2009 | Murphy et al. |
| 7,480,870 B2 | 1/2009 | Anzures et al. |
| D588,560 S | 3/2009 | Mellingen et al. |
| D589,053 S | 3/2009 | Steele et al. |
| 7,505,036 B1 | 3/2009 | Baldwin |
| D591,306 S | 4/2009 | Setiawan et al. |
| 7,518,051 B2 | 4/2009 | Redmann |
| D592,621 S | 5/2009 | Han |
| 7,529,425 B2 | 5/2009 | Kitamura et al. |
| 7,532,230 B2 | 5/2009 | Culbertson et al. |
| 7,532,232 B2 | 5/2009 | Shah et al. |
| 7,534,056 B2 | 5/2009 | Cross et al. |
| 7,545,761 B1 | 6/2009 | Kalbag |
| 7,551,432 B1 * | 6/2009 | Bockheim et al. ....... 361/679.27 |
| 7,555,141 B2 | 6/2009 | Mori |
| D595,728 S | 7/2009 | Scheibe et al. |
| D596,646 S | 7/2009 | Wani |
| 7,575,537 B2 | 8/2009 | Ellis |
| D602,033 S | 10/2009 | Vu et al. |
| D602,453 S | 10/2009 | Ding et al. |
| D602,495 S | 10/2009 | Um et al. |
| 7,610,352 B2 | 10/2009 | AlHusseini et al. |
| 7,610,599 B1 | 10/2009 | Nashida et al. |
| 7,616,226 B2 | 11/2009 | Roessler et al. |
| D608,788 S | 1/2010 | Meziere |
| 7,646,419 B2 | 1/2010 | Cernasov |
| D610,560 S | 2/2010 | Chen |
| 7,661,075 B2 | 2/2010 | Lahdesmaki |
| 7,664,750 B2 | 2/2010 | Frees et al. |
| D612,394 S | 3/2010 | La et al. |
| 7,676,763 B2 | 3/2010 | Rummel |
| 7,679,639 B2 | 3/2010 | Harrell et al. |
| 7,692,680 B2 | 4/2010 | Graham et al. |
| 7,707,247 B2 | 4/2010 | Dunn et al. |
| D615,514 S | 5/2010 | Mellingen et al. |
| 7,710,448 B2 | 5/2010 | De Beer et al. |
| 7,710,450 B2 | 5/2010 | Dhuey et al. |
| 7,715,657 B2 | 5/2010 | Lin et al. |
| 7,719,605 B2 | 5/2010 | Hirasawa et al. |
| 7,719,662 B2 | 5/2010 | Bamji et al. |
| 7,720,277 B2 | 5/2010 | Hattori |
| D617,806 S | 6/2010 | Christie et al. |
| D619,608 S | 7/2010 | Meziere |
| D619,609 S | 7/2010 | Meziere |
| D619,610 S | 7/2010 | Meziere |
| D619,611 S | 7/2010 | Meziere |
| 7,752,568 B2 | 7/2010 | Park et al. |
| D621,410 S | 8/2010 | Verfuerth et al. |
| D626,102 S | 10/2010 | Buzzard et al. |
| D626,103 S | 10/2010 | Buzzard et al. |
| D628,175 S | 11/2010 | Desai et al. |
| 7,839,434 B2 | 11/2010 | Ciudad et al. |
| D628,968 S | 12/2010 | Desai et al. |
| 7,861,189 B2 | 12/2010 | Watanabe et al. |
| D631,891 S | 2/2011 | Vance et al. |
| D632,698 S | 2/2011 | Judy et al. |
| 7,889,851 B2 | 2/2011 | Shah et al. |
| 7,890,888 B2 | 2/2011 | Glasgow et al. |
| 7,894,531 B1 | 2/2011 | Cetin et al. |
| D634,726 S | 3/2011 | Harden et al. |
| D634,753 S | 3/2011 | Loretan et al. |
| D635,569 S | 4/2011 | Park |
| D635,975 S | 4/2011 | Seo et al. |
| D637,199 S | 5/2011 | Brinda |
| D638,025 S | 5/2011 | Saft et al. |
| D638,850 S | 5/2011 | Woods et al. |
| D638,853 S | 5/2011 | Brinda |
| 7,939,959 B2 | 5/2011 | Wagoner |
| D640,268 S | 6/2011 | Jones et al. |
| D642,184 S | 7/2011 | Brouwers et al. |
| 7,990,422 B2 | 8/2011 | Ahiska et al. |
| 7,996,775 B2 | 8/2011 | Cole et al. |
| 8,000,559 B2 | 8/2011 | Kwon |
| D646,690 S | 10/2011 | Thai et al. |
| D648,734 S | 11/2011 | Christie et al. |
| D649,556 S | 11/2011 | Judy et al. |
| 8,077,857 B1 | 12/2011 | Lambert |
| D652,050 S | 1/2012 | Chaudhri |
| D652,429 S | 1/2012 | Steele et al. |
| D654,926 S | 2/2012 | Lipman et al. |

| | | |
|---|---|---|
| D656,513 S | 3/2012 | Thai et al. |
| 8,130,256 B2 | 3/2012 | Trachtenberg et al. |
| 8,132,100 B2 | 3/2012 | Seo et al. |
| 8,135,068 B1 | 3/2012 | Alvarez |
| D656,948 S | 4/2012 | Knudsen et al. |
| D660,313 S | 5/2012 | Williams et al. |
| 8,179,419 B2 | 5/2012 | Girish et al. |
| 8,209,632 B2 | 6/2012 | Reid et al. |
| 8,219,920 B2 | 7/2012 | Langoulant et al. |
| D664,985 S | 8/2012 | Tanghe et al. |
| D669,086 S | 10/2012 | Boyer et al. |
| D669,088 S | 10/2012 | Boyer et al. |
| D669,913 S | 10/2012 | Maggiotto et al. |
| D670,723 S | 11/2012 | Khan et al. |
| D671,136 S | 11/2012 | Barnett et al. |
| D671,141 S | 11/2012 | Peters et al. |
| 8,339,499 B2 | 12/2012 | Ohuchi |
| 2002/0047892 A1 | 4/2002 | Gonsalves |
| 2002/0106120 A1 | 8/2002 | Brandenburg et al. |
| 2002/0108125 A1 | 8/2002 | Joao |
| 2002/0113827 A1 | 8/2002 | Perlman et al. |
| 2002/0118890 A1 | 8/2002 | Rondinelli |
| 2002/0131608 A1 | 9/2002 | Lobb et al. |
| 2002/0149672 A1 | 10/2002 | Clapp et al. |
| 2002/0163538 A1 | 11/2002 | Shteyn |
| 2002/0186528 A1 | 12/2002 | Huang |
| 2003/0017872 A1 | 1/2003 | Oishi et al. |
| 2003/0048218 A1 | 3/2003 | Milnes et al. |
| 2003/0072460 A1 | 4/2003 | Gonopolskiy et al. |
| 2003/0160861 A1 | 8/2003 | Barlow et al. |
| 2003/0179285 A1 | 9/2003 | Naito |
| 2003/0185303 A1 | 10/2003 | Hall |
| 2003/0197687 A1 | 10/2003 | Shetter |
| 2004/0003411 A1 | 1/2004 | Nakai et al. |
| 2004/0032906 A1 | 2/2004 | Lillig |
| 2004/0038169 A1 | 2/2004 | Mandelkern et al. |
| 2004/0039778 A1 | 2/2004 | Read et al. |
| 2004/0061787 A1 | 4/2004 | Liu et al. |
| 2004/0091232 A1 | 5/2004 | Appling, III |
| 2004/0118984 A1 | 6/2004 | Kim et al. |
| 2004/0119814 A1 | 6/2004 | Clisham et al. |
| 2004/0164858 A1 | 8/2004 | Lin |
| 2004/0165060 A1 | 8/2004 | McNelley et al. |
| 2004/0178955 A1 | 9/2004 | Menache et al. |
| 2004/0189463 A1 | 9/2004 | Wathen |
| 2004/0189676 A1 | 9/2004 | Dischert |
| 2004/0196250 A1 | 10/2004 | Mehrotra et al. |
| 2004/0207718 A1* | 10/2004 | Boyden et al. ............ 348/14.01 |
| 2004/0218755 A1 | 11/2004 | Marton et al. |
| 2004/0221243 A1 | 11/2004 | Twerdahl et al. |
| 2004/0246962 A1 | 12/2004 | Kopeikin et al. |
| 2004/0254982 A1 | 12/2004 | Hoffman et al. |
| 2004/0260796 A1 | 12/2004 | Sundqvist et al. |
| 2005/0007954 A1 | 1/2005 | Sreemanthula et al. |
| 2005/0022130 A1 | 1/2005 | Fabritius |
| 2005/0024484 A1 | 2/2005 | Leonard |
| 2005/0034084 A1 | 2/2005 | Ohtsuki et al. |
| 2005/0039142 A1 | 2/2005 | Jalon et al. |
| 2005/0050246 A1 | 3/2005 | Lakkakorpi et al. |
| 2005/0081160 A1 | 4/2005 | Wee et al. |
| 2005/0099492 A1 | 5/2005 | Orr |
| 2005/0110867 A1 | 5/2005 | Schulz |
| 2005/0117022 A1 | 6/2005 | Marchant |
| 2005/0129325 A1 | 6/2005 | Wu |
| 2005/0147257 A1 | 7/2005 | Melchior et al. |
| 2005/0149872 A1 | 7/2005 | Fong et al. |
| 2005/0154988 A1 | 7/2005 | Proehl et al. |
| 2005/0223069 A1 | 10/2005 | Cooperman et al. |
| 2005/0235209 A1 | 10/2005 | Morita et al. |
| 2005/0248652 A1 | 11/2005 | Firestone et al. |
| 2005/0251760 A1 | 11/2005 | Sato et al. |
| 2005/0268823 A1 | 12/2005 | Bakker et al. |
| 2006/0013495 A1 | 1/2006 | Duan et al. |
| 2006/0017807 A1 | 1/2006 | Lee et al. |
| 2006/0028983 A1 | 2/2006 | Wright |
| 2006/0038878 A1 | 2/2006 | Takashima et al. |
| 2006/0048070 A1 | 3/2006 | Taylor et al. |
| 2006/0066717 A1 | 3/2006 | Miceli |
| 2006/0072813 A1 | 4/2006 | Matsumoto et al. |
| 2006/0082643 A1 | 4/2006 | Richards |
| 2006/0093128 A1 | 5/2006 | Oxford |
| 2006/0100004 A1 | 5/2006 | Kim et al. |
| 2006/0104470 A1 | 5/2006 | Akino |
| 2006/0120307 A1 | 6/2006 | Sahashi |
| 2006/0120568 A1 | 6/2006 | McConville et al. |
| 2006/0125691 A1 | 6/2006 | Menache et al. |
| 2006/0126878 A1 | 6/2006 | Takumai et al. |
| 2006/0152489 A1 | 7/2006 | Sweetser et al. |
| 2006/0152575 A1 | 7/2006 | Amiel et al. |
| 2006/0158509 A1 | 7/2006 | Kenoyer et al. |
| 2006/0168302 A1 | 7/2006 | Boskovic et al. |
| 2006/0170769 A1 | 8/2006 | Zhou |
| 2006/0181607 A1 | 8/2006 | McNelley et al. |
| 2006/0200518 A1 | 9/2006 | Sinclair et al. |
| 2006/0233120 A1 | 10/2006 | Eshel et al. |
| 2006/0256187 A1 | 11/2006 | Sheldon et al. |
| 2006/0284786 A1 | 12/2006 | Takano et al. |
| 2006/0289772 A1 | 12/2006 | Johnson et al. |
| 2007/0022388 A1 | 1/2007 | Jennings |
| 2007/0039030 A1 | 2/2007 | Romanowich et al. |
| 2007/0040903 A1 | 2/2007 | Kawaguchi |
| 2007/0070177 A1 | 3/2007 | Christensen |
| 2007/0074123 A1 | 3/2007 | Omura et al. |
| 2007/0080845 A1 | 4/2007 | Amand |
| 2007/0112966 A1 | 5/2007 | Eftis et al. |
| 2007/0120971 A1 | 5/2007 | Kennedy |
| 2007/0121353 A1 | 5/2007 | Zhang et al. |
| 2007/0140337 A1 | 6/2007 | Lim et al. |
| 2007/0153712 A1 | 7/2007 | Fry et al. |
| 2007/0157119 A1 | 7/2007 | Bishop |
| 2007/0159523 A1 | 7/2007 | Hillis et al. |
| 2007/0162866 A1 | 7/2007 | Matthews et al. |
| 2007/0183661 A1 | 8/2007 | El-Maleh et al. |
| 2007/0188597 A1 | 8/2007 | Kenoyer et al. |
| 2007/0192381 A1 | 8/2007 | Padmanabhan |
| 2007/0206091 A1 | 9/2007 | Dunn et al. |
| 2007/0206556 A1 | 9/2007 | Yegani et al. |
| 2007/0217406 A1 | 9/2007 | Riedel et al. |
| 2007/0217500 A1 | 9/2007 | Gao et al. |
| 2007/0229250 A1 | 10/2007 | Recker et al. |
| 2007/0240073 A1 | 10/2007 | McCarthy et al. |
| 2007/0247470 A1 | 10/2007 | Dhuey et al. |
| 2007/0250567 A1 | 10/2007 | Graham et al. |
| 2007/0250620 A1 | 10/2007 | Shah et al. |
| 2007/0273752 A1* | 11/2007 | Chambers et al. ......... 348/14.02 |
| 2007/0279483 A1 | 12/2007 | Beers et al. |
| 2007/0279484 A1 | 12/2007 | Derocher et al. |
| 2008/0046840 A1 | 2/2008 | Melton et al. |
| 2008/0077390 A1 | 3/2008 | Nagao |
| 2008/0077883 A1 | 3/2008 | Kim et al. |
| 2008/0084429 A1 | 4/2008 | Wissinger |
| 2008/0119211 A1 | 5/2008 | Paas et al. |
| 2008/0134098 A1 | 6/2008 | Hoglund et al. |
| 2008/0136896 A1 | 6/2008 | Graham et al. |
| 2008/0148187 A1 | 6/2008 | Miyata et al. |
| 2008/0151038 A1 | 6/2008 | Khouri et al. |
| 2008/0167078 A1 | 7/2008 | Eibye |
| 2008/0208444 A1 | 8/2008 | Ruckart |
| 2008/0212677 A1 | 9/2008 | Chen et al. |
| 2008/0215974 A1 | 9/2008 | Harrison et al. |
| 2008/0215993 A1 | 9/2008 | Rossman |
| 2008/0218582 A1 | 9/2008 | Buckler |
| 2008/0232692 A1 | 9/2008 | Kaku |
| 2008/0240237 A1 | 10/2008 | Tian et al. |
| 2008/0240571 A1 | 10/2008 | Tian et al. |
| 2008/0246833 A1 | 10/2008 | Yasui et al. |
| 2008/0256474 A1 | 10/2008 | Chakra et al. |
| 2008/0261569 A1 | 10/2008 | Britt et al. |
| 2008/0266380 A1 | 10/2008 | Gorzynski et al. |
| 2008/0267282 A1 | 10/2008 | Kalipatnapu et al. |
| 2008/0276184 A1 | 11/2008 | Buffet et al. |
| 2008/0297586 A1 | 12/2008 | Kurtz et al. |
| 2008/0298571 A1 | 12/2008 | Kurtz et al. |
| 2008/0303901 A1 | 12/2008 | Variyath et al. |
| 2009/0009593 A1 | 1/2009 | Cameron et al. |
| 2009/0012633 A1 | 1/2009 | Liu et al. |
| 2009/0037827 A1 | 2/2009 | Bennetts |
| 2009/0051756 A1 | 2/2009 | Trachtenberg |

| Pub. No. | Date | Inventor |
|---|---|---|
| 2009/0115723 A1 | 5/2009 | Henty |
| 2009/0119603 A1 | 5/2009 | Stackpole |
| 2009/0122867 A1 | 5/2009 | Mauchly et al. |
| 2009/0172596 A1 | 7/2009 | Yamashita |
| 2009/0174764 A1 | 7/2009 | Chadha et al. |
| 2009/0183122 A1 | 7/2009 | Webb et al. |
| 2009/0193345 A1 | 7/2009 | Wensley et al. |
| 2009/0204538 A1 | 8/2009 | Ley et al. |
| 2009/0207233 A1 | 8/2009 | Mauchly et al. |
| 2009/0207234 A1 | 8/2009 | Chen et al. |
| 2009/0217199 A1 | 8/2009 | Hara et al. |
| 2009/0228807 A1 | 9/2009 | Lemay |
| 2009/0244257 A1 | 10/2009 | MacDonald et al. |
| 2009/0256901 A1 | 10/2009 | Mauchly et al. |
| 2009/0260060 A1 | 10/2009 | Smith et al. |
| 2009/0265628 A1 | 10/2009 | Bamford et al. |
| 2009/0279476 A1 | 11/2009 | Li et al. |
| 2009/0324023 A1 | 12/2009 | Tian et al. |
| 2010/0005419 A1 | 1/2010 | Miichi et al. |
| 2010/0027907 A1 | 2/2010 | Cherna et al. |
| 2010/0030389 A1 | 2/2010 | Palmer et al. |
| 2010/0049542 A1 | 2/2010 | Benjamin et al. |
| 2010/0082557 A1 | 4/2010 | Gao et al. |
| 2010/0118112 A1 | 5/2010 | Nimri et al. |
| 2010/0123770 A1 | 5/2010 | Friel et al. |
| 2010/0171807 A1 | 7/2010 | Tysso |
| 2010/0171808 A1 | 7/2010 | Harrell et al. |
| 2010/0183199 A1 | 7/2010 | Smith et al. |
| 2010/0199228 A1 | 8/2010 | Latta et al. |
| 2010/0201823 A1 | 8/2010 | Zhang et al. |
| 2010/0205281 A1 | 8/2010 | Porter et al. |
| 2010/0205543 A1 | 8/2010 | Von Werther et al. |
| 2010/0208078 A1 | 8/2010 | Tian et al. |
| 2010/0225732 A1 | 9/2010 | De Beer et al. |
| 2010/0225735 A1 | 9/2010 | Shaffer et al. |
| 2010/0259619 A1* | 10/2010 | Nicholson ............ 348/158 |
| 2010/0262367 A1 | 10/2010 | Riggins et al. |
| 2010/0268843 A1 | 10/2010 | Van Wie et al. |
| 2010/0277563 A1 | 11/2010 | Gupta et al. |
| 2010/0283829 A1 | 11/2010 | De Beer et al. |
| 2010/0302345 A1 | 12/2010 | Baldino et al. |
| 2010/0306703 A1 | 12/2010 | Bourganel et al. |
| 2010/0313148 A1 | 12/2010 | Hochendoner et al. |
| 2010/0316232 A1 | 12/2010 | Acero et al. |
| 2010/0325547 A1 | 12/2010 | Keng et al. |
| 2011/0008017 A1 | 1/2011 | Gausereide |
| 2011/0029868 A1 | 2/2011 | Moran et al. |
| 2011/0037636 A1 | 2/2011 | Alexander |
| 2011/0063467 A1 | 3/2011 | Tanaka |
| 2011/0082808 A1 | 4/2011 | Beykpour et al. |
| 2011/0085016 A1 | 4/2011 | Kristiansen et al. |
| 2011/0109642 A1 | 5/2011 | Chang et al. |
| 2011/0113348 A1 | 5/2011 | Twiss et al. |
| 2011/0164106 A1 | 7/2011 | Kim |
| 2011/0202878 A1 | 8/2011 | Park et al. |
| 2011/0225534 A1 | 9/2011 | Wala |
| 2011/0242266 A1 | 10/2011 | Blackburn et al. |
| 2011/0249081 A1 | 10/2011 | Kay et al. |
| 2011/0249086 A1 | 10/2011 | Guo et al. |
| 2011/0276901 A1 | 11/2011 | Zambetti et al. |
| 2011/0279627 A1 | 11/2011 | Shyu |
| 2011/0319885 A1 | 12/2011 | Skwarek et al. |
| 2012/0026278 A1 | 2/2012 | Goodman et al. |
| 2012/0038742 A1 | 2/2012 | Robinson et al. |
| 2012/0226997 A1 | 9/2012 | Pang |
| 2012/0266082 A1 | 10/2012 | Webber |
| 2012/0297342 A1 | 11/2012 | Jang et al. |
| 2012/0327173 A1 | 12/2012 | Couse et al. |

FOREIGN PATENT DOCUMENTS

| | | |
|---|---|---|
| EP | 502600 A2 | 9/1992 |
| EP | 0 650 299 | 10/1994 |
| EP | 0 714 081 | 11/1995 |
| EP | 0 740 177 | 4/1996 |
| EP | 1143745 A2 | 10/2001 |
| EP | 1 178 352 A1 | 6/2002 |
| EP | 1 589 758 A1 | 10/2005 |
| EP | 1701308 A2 | 9/2006 |
| EP | 1768058 A2 | 3/2007 |
| EP | 2073543 A1 | 6/2009 |
| EP | 2255531 | 12/2010 |
| EP | 2277308 | 1/2011 |
| GB | 2 294 605 A | 5/1996 |
| GB | 2336266 | 10/1999 |
| GB | 2355876 A | 5/2001 |
| WO | WO 94/16517 | 7/1994 |
| WO | WO 96/21321 | 7/1996 |
| WO | WO 97/08896 | 3/1997 |
| WO | WO 98/47291 | 10/1998 |
| WO | WO 99/59026 | 11/1999 |
| WO | WO 01/33840 | 5/2001 |
| WO | WO 2005/013001 A2 | 2/2005 |
| WO | WO 2006/072755 | 7/2006 |
| WO | WO2007/106157 | 9/2007 |
| WO | WO2007/123946 | 11/2007 |
| WO | WO 2007/123960 A2 | 11/2007 |
| WO | WO2008/039371 | 4/2008 |
| WO | WO 2008/040258 | 4/2008 |
| WO | WO 2008/101117 A1 | 8/2008 |
| WO | WO 2008/118887 A2 | 10/2008 |
| WO | WO 2009/102503 A2 | 8/2009 |
| WO | WO 2009/120814 A2 | 10/2009 |
| WO | WO 2010/059481 | 5/2010 |
| WO | WO2010/096342 | 8/2010 |
| WO | WO 2010/104765 | 9/2010 |
| WO | WO 2010/132271 | 11/2010 |
| WO | WO2012/033716 | 3/2012 |
| WO | WO2012/068008 | 5/2012 |
| WO | WO2012/068010 | 5/2012 |
| WO | WO2012/068485 | 5/2012 |

OTHER PUBLICATIONS

Design U.S. Appl. No. 29/375,624, filed Sep. 24, 2010, entitled "Mounted Video Unit," Inventor(s): Ashok T. Desai et al.

Design U.S. Appl. No. 29/375,627, filed Sep. 24, 2010, entitled "Mounted Video Unit," Inventor(s): Ashok T. Desai et al.

Design U.S. Appl. No. 29/369,951, filed Sep. 15, 2010, entitled "Video Unit With Integrated Features," Inventor(s): Kyle A. Buzzard et al.

Design U.S. Appl. No. 29/375,458, filed Sep. 22, 2010, entitled "Video Unit With Integrated Features," Inventor(s): Kyle A. Buzzard et al.

Design U.S. Appl. No. 29/358,009, filed Mar. 21, 2010, entitled "Free-Standing Video Unit," Inventor(s): Ashok T. Desai et al.

Design U.S. Appl. No. 29/375,619, filed Sep. 24, 2010, entitled "Free- Standing Video Unit," Inventor(s): Ashok T. Desai et al.

U.S. Appl. No. 12/781,722, filed May 17, 2010, entitled "System and Method for Providing Retracting Optics in a Video Conferencing Environment," Inventor(s): Joseph T. Friel, et al.

Joshua Gluckman and S.K. Nayar, "Rectified Catadioptric Stereo Sensors," 8 pages, retrieved and printed on May 17, 2010; http://cis.poly.edu/~gluckman/papers/cypr00.pdf.

France Telecom R&D, "France Telecom's Magic Telepresence Wall—Human Productivity Lab," 5 pages, retrieved and printed on May 17, 2010; http://www.humanproductivitylab.com/archive_blogs/2006/07/11/france_telecoms_magic_telepres_1.php.

Digital Video Enterprises, "DVE Eye Contact Silhouette," 1 page, © DVE 2008; http://www.dvetelepresence.com/products/eyeContactSilhouette.asp.

R.V. Kollarits, et al., "34.3: An Eye Contact Camera/Display System for Videophone Applications Using a Conventional Direct-View LCD," © 1995 SID, ISSN0097-0966X/95/2601, pp. 765-768; http://citeseerx.ist.psu.edu/viewdoc/download;jsessionid=47A1E7E-028C26503975E633895D114EC?doi=10.1.1.42.1772&rep=rep1&type=pdf.

Trevor Darrell, "A Real-Time Virtual Mirror Display," 1 page, Sep. 9, 1998; http://people.csail.mit.edu/trevor/papers/1998-021/node6.html.

3G, "World's First 3G Video Conference Service with New TV Commercial," Apr. 28, 2005, 4 pages; http://www.3g.co.uk/PR/April2005/1383.htm.

U.S. Appl. No. 13/096,772, filed Apr. 28, 2011, entitled "System and Method for Providing Enhanced Eye Gaze in a Video Conferencing Environment," Inventor(s): Charles C. Byers.

U.S. Appl. No. 13/106,002, filed May 12, 2011, entitled "System and Method for Video Coding in a Dynamic Environment," Inventors: Dihong Tian et al.
U.S. Appl. No. 13/098,430, filed Apr. 30, 2011, entitled "System and Method for Transferring Transparency Information in a Video Environment," Inventors: Eddie Collins et al.
U.S. Appl. No. 13/096,795, filed Apr. 28, 2011, entitled "System and Method for Providing Enhanced Eye Gaze in a Video Conferencing Environment," Inventors: Charles C. Byers.
U.S. Appl. No. 13/298,022, filed Nov. 16, 2011, entitled "System and Method for Alerting a Participant in a Video Conference," Inventor(s): TiongHu Lian, et al.
Design U.S. Appl. No. 29/389,651, filed Apr. 14, 2011, entitled "Video Unit With Integrated Features," Inventor(s): Kyle A. Buzzard et al.
Design U.S. Appl. No. 29/389,654, filed Apr. 14, 2011, entitled "Video Unit With Integrated Features," Inventor(s): Kyle A. Buzzard et al.
EPO Communication dated Feb. 25, 2011 for EP09725288.6 (published as EP22777308); 4 pages.
EPO Aug. 15, 2011 Response to EPO Communication mailed Feb. 25, 2011 from European Patent Application No. 09725288.6; 15 pages.
PCT Sep. 25, 2007 Notification of Transmittal of the International Search Report from PCT/US06/45895.
PCT Sep. 2, 2008 International Preliminary Report on Patentability (1 page) and the Written Opinion of th ISA (4 pages) from PCT/US2006/045895.
PCT Sep. 11, 2008 Notification of Transmittal of the International Search Report from PCT/US07/09469.
PCT Nov. 4, 2008 International Preliminary Report on Patentability (1 page) and the Written Opinion of the ISA (8 pages) from PCT/US2007/009469.
PCT May 11, 2010 International Search Report from PCT/US2010/024059; 4 pages.
PCT Aug. 23, 2011 International Preliminary Report on Patentability and Written Opinion of the ISA from PCT/US2010/024059; 6 pages.
PCT Sep. 13, 2011 International Preliminary Report on Patentability and the Written Opinion of the ISA from PCT/US2010/026456; 5 pages.
PCT Oct. 12, 2011 International Search Report and Written Opinion of the ISA from PCT/US2011/050380.
PCT Nov. 24, 2011 International Preliminary Report on Patentability from International Application No. PCT/US2010/033880; 6 pages.
Dornaika F., et al., ""Head and Facial Animation Tracking Using Appearance-Adaptive Models and Particle Filters,"" 20040627; 20040627-20040602, Jun. 27, 2004, 22 pages; HEUDIASY Research Lab, http://eprints.pascal-network.org/archive/00001231/01/rtvhci_chapter8.pdf.
Hammadi, Nait Charif et al., ""Tracking the Activity of Participants in a Meeting,"" Machine Vision and Applications, Springer, Berlin, De Lnkd—DOI:10.1007/S00138-006-0015-5, vol. 17, No. 2, May 1, 2006, pp. 83-93, XP019323925 http://citeseerx.ist.psu.edu/viewdoc/summary?doi=10.1.1.106.9832.
Kwolek, B., "Model Based Facial Pose Tracking Using a Particle Filter," Geometric Modeling and Imaging—New Trends, 2006 London, England Jul. 5-6, 2005, Piscataway, NJ, USA, IEEE LNKD-DOI: 10.1109/GMAI.2006.34 Jul. 5, 2006, pp. 203-208; XP010927285 [Abstract Only].
U.S. Appl. No. 12/366,593, flied Feb. 5, 2009, entitled "System and Method for Depth Perspective Image Rendering," Inventor(s): J. William Mauchly et al.
U.S. Appl. No. 12/727,089, filed Mar. 18, 2010, entitled "System and Method for Enhancinh Video Images in a Conferencing Environment," Inventor: Joseph T. Friel.
U.S. Appl. No. 12/877,733, filed Sep. 8, 2010, entitled "System and Method for Skip Coding During Video Conferencing in a Network Environment," Inventor(s): Dihong Tian, et al.
U.S. Appl. No. 12/870,687, flied Aug. 27, 2010, entitled "System and Method for Producing a Performance Via Video Conferencing in a Network Environment," Inventor(s): Michael A. Arnao et al.

U.S. Appl. No. 12/912,556, filed Oct. 26, 2010, for "System and Method for Provisioning Flows in a Mobile Network Environment," Inventors: Balaji Vankay Vankataswami, et al.
U.S. Appl. No. 12/873,100, filed Aug. 31, 2010, entitled "System and Method for Providing Depth Adaptive Video Conferencing," Inventor(s): J. William Mauchly et al.
U.S. Appl. No. 12/946,679, filed Nov. 15, 2010, entitled "System and Method for Providing Camera Functions in a Video Environment," Inventors: Peter A.J. Fornell, et al.
U.S. Appl. No. 12/946,695, filed Nov. 15, 2010, entitled "System and Method for Providing Enhanced Audio in a Video Environment," Inventors: Wei Li, et al.
U.S. Appl. No. 12/907,914, filed Oct. 19, 2010, entitled "System and Method for Providing Videomail in a Network Environment," Inventors: David J. Mackie et al.
U.S. Appl. No. 12/950,786, filed Nov. 19, 2010, "System and Method for Providing Enhanced Video Processing in a Network Environment," Inventor[s]: David J. Mackie.
U.S. Appl. No. 12/907,919, filed Oct. 19, 2010, entitled "System and Method for Providing Connectivity in a Network Environment," Inventors: David J. Mackie et al.
U.S. Appl. No. 12/946,704, filed Nov. 15, 2010, entitled "System and Method for Providing Enhanced Graphics in a Video Environment," Inventors: John M. Kanalakis, Jr., et al.
U.S. Appl. No. 12/957,116, filed Nov. 30, 2010, entitled "System and Method for Gesture Interface Control," Inventors: Shuan K. Kirby, et al.
U.S. Appl. No. 13/036,925, filed Feb. 28, 2011, entitled "System and Method for Selection of Video Data in a Video Conference Environment," Inventor(s) Sylvia Olayinka Aya Manfa N'guessam.
U.S. Appl. No. 12/907,925, filed Oct. 19, 2010, entitled "System and Method for Providing a Pairing Mechanism in a Video Environment," Inventors: Gangfeng Kong et al.
U.S. Appl. No. 12/939,037, filed Nov. 3, 2010, entitled "System and Method for Managing Flows in a Mobile Network Environment," Inventors: Balaji Venkat Venkataswami et al.
U.S. Appl. No. 12/946,709, filed Nov. 15, 2010, entitled "System and Method for Providing Enhanced Graphics in a Video Environment," Inventors: John M. Kanalakis, Jr., et al.
U.S. Appl. No. 12/784,257, filed May 20, 2010, entitled "Implementing Selective Image Enhancement," Inventors: Dihong, Tian et al.
Design U.S. Appl. No. 29/381,245, filed Dec. 16, 2010, entitled "Interface Element," Inventor(s): John M. Kanalakis, Jr., et al.
Design U.S. Appl. No. 29/381,250, filed Dec. 16, 2010, entitled "Interface Element," Inventor(s): John M. Kanalakis, Jr., et al.
Design U.S. Appl. No. 29/381,254, filed Dec. 16, 2010, entitled "Interface Element," Inventor(s): John M. Kanalakis, Jr., et al.
Design U.S. Appl. No. 29/381,256, filed Dec. 16, 2010, entitled "Interface Element," Inventor(s): John M. Kanalakis Jr., et al.
Design U.S. Appl. No. 29/381,259, filed Dec. 16, 2010, entitled "Interface Element," Inventor(s): John M. Kanalakis, Jr., et al.
Design U.S. Appl. No. 29/381,260 filed, Dec. 16, 2010, entitled "Interface Element," Inventor(s): John M. Kanalakis, Jr., et al.
Design U.S. Appl. No. 29/381,262, filed Dec. 16, 2010, entitled "Interface Element," Inventor(s): John M. Kanalakis, Jr., et al.
Design U.S. Appl. No. 29/381,264, filed Dec. 16, 2010, entitled "Interface Element," Inventor(s): John M. Kanalakis, Jr., et al.
"3D Particles Experiments in AS3 and Flash CS3," [retrieved and printed on Mar. 18, 2010]; 2 pages; http://www.flashandmath.com/advanced/fourparticles/notes.html.
"Cisco Expo Germany 2009 Opening," Posted on YouTube on May 4, 2009; http://www.youtube.com/watch?v=SDKsaSlz4MK; 2 pages.
"Eye Tracking," from Wikipedia, (printed on Aug. 31, 2011) 12 pages; http://en.wikipedia.org/wiki/Eye_tracker.
"Infrared Cameras TVS-200-EX," [retrieved and printed on May 24, 2010] http://www.electrophysics.com/Browse/Brw_ProductLineCategory.asp?CategoryID=184&Area=IS; 2 pages.
"RoundTable, 360 Degrees Video Conferencing Camera unveiled by Microsoft," TechShout, Jun. 30, 2006, 1 page; http://www.techshout.com/gadgets/2006/30/roundtable-360-degrees-video-conferencing-camera-unveiled-by-microsoft/#.
"Vocative Case," from Wikipedia, [retrieved and printed on Mar. 3, 2011] 11 pages; http://en.wikipedia.org/wiki/Vocative_case.

"Custom 3D Depth Sensing Prototype System for Gesture Control," 3D Depth Sensing, GestureTek, 3 pages; [Retrieved and printed on Dec. 1, 2010] http://www.gesturetek.com/3ddepth/introduction.php.

"Eye Gaze Response Interface Computer Aid (Erica) tracks Eye movement to enable hands-free computer operation," UMD Communication Sciences and Disorders Tests New Technology, University of Minnesota Duluth, posted Jan. 19, 2005; 4 pages http://www.d.umn.edu/unirel/homepage/05/eyegaze.html.

"Real-time Hand Motion/Gesture Detection for HCI-Demo 2," video clip, YouTube, posted Dec. 17, 2008 by smmy0705, 1 page; www.youtube.com/watch?v=mLT4CFLIi8A&feature=related.

"Simple Hand Gesture Recognition," video clip, YouTube, posted Aug. 25, 2008 by pooh8210, 1 page; http://www.youtube.com/watch?v=F8GVeV0dYLM&feature=related.

Active8-3D—Holographic Projection—3D Hologram Retail Display & Video Project, [retrieved and printed on Feb. 24, 2009], http://www.activ8-3d.co.uk/3d_holocubes; 1 page.

Andersson, L., et al., "LDP Specification," Network Working Group, RFC 3036, Jan. 2001, 133 pages; http://tools.ietf.org/html/rfc3036.

Andreopoulos, Yiannis, et al., "In-Band Motion Compensated Temporal Filtering," Signal Processing: Image Communication 19 (2004) 653-673, 21 pages http://medianetlab.ee.ucla.edu/papers/011.pdf.

Arrington, Michael, "eJamming—Distributed Jamming," TechCrunch; Mar. 16, 2006; http://www.techcrunch.com/2006/03/16/ejamming-distributed-jamming/; 1 page.

Arulampalam, M. Sanjeev, et al., "A Tutorial on Particle Filters for Online Nonlinear/Non-Gaussian Bayesian Tracking," IEEE Transactions on Signal Processing, vol. 50, No. 2, Feb. 2002, 15 pages; http://www.cs.ubc.ca/~murphyk/Software/Kalman/ParticleFilterTutorial.pdf.

Hock, Hans Henrich, "Prosody vs. Syntax: Prosodic rebracketing of final vocatives in English," 4 pages; [retrieved and printed on Mar. 3, 2011] http://speechprosody2010.illinois.edu/papers/100931.pdf.

Holographic Imaging, "Dynamic Holography for scientific uses, military heads up display and even someday HoloTV Using TI's DMD," [retrieved and printed on Feb. 26, 2009] http://innovation.swmed.edu/research/instrumentation/res_inst_dev3d.html; 5 pages.

Hornbeck, Larry J., "Digital Light ProcessingTM: A New MEMS-Based Display Technology," [retrieved and printed on Feb. 26, 2009] http://focus.ti.com/pdfs/dlpdmd/17_Digital_Light_Processing_MEMS_display_technology.pdf; 22 pages.

IR Distribution Category @ Envious Technology, "IR Distribution Category," [retrieved and printed on Apr. 22, 2009] http://www.envioustechnology.com.au/ products/product-list.php?CID=305; 2 pages.

IR Trans—Products and Orders—Ethernet Devices, [retrieved and printed on Apr. 22, 2009] http://www.irtrans.de/en/shop/lan.php; 2 pages.

Isgro, Francesco et al., "Three-Dimensional Image Processing in the Future of Immersive Media," IEEE Transactions on Circuits and Systems for Video Technology, vol. 14, No. 3; XP011108796; ISSN: 1051-8215; Mar. 1, 2004; pp. 288-303.

Itoh, Hiroyasu, et al., "Use of a gain modulating framing camera for time-resolved imaging of cellular phenomena," SPIE vol. 2979, 1997, pp. 733-740.

Jamoussi, Bamil, "Constraint-Based LSP Setup Using LDP," MPLS Working Group, Sep. 1999, 34 pages; http://tools.ietf.org/html/draft-ietf-mpls-cr-ldp-03.

Jeyatharan, M., et al., "3GPP TFT Reference for Flow Binding," MEXT Working Group, Mar. 2, 2010, 11 pages; http:/www.ietf.org/id/draft-jeyatharan-mext-flow-tftemp-reference-00.txt.

Jiang, Minqiang, et al., "On Lagrange Multiplier and Quantizer Adjustment for H.264 Frame-layer Video Rate Control," IEEE Transactions on Circuits and Systems for Video Technology, vol. 16, Issue 5, May 2006, pp. 663-669.

Jong-Gook Ko et al., "Facial Feature Tracking and Head Orientation-Based Gaze Tracking," ITC-CSCC 2000, International Technical Conference on Circuits/Systems, Jul. 11-13, 2000, 4 pages http://www.umiacs.umd.edu/~knkim/paper/itc-cscc-2000-jgko.pdf.

Kannangara, C.S., et al., "Complexity Reduction of H.264 Using Lagrange Multiplier Methods," IEEE Int. Conf. on Visual Information Engineering, Apr. 2005; www.rgu.ac.uk/files/h264_complexity_kannangara.pdf; 6 pages.

Kannangara, C.S., et al., "Low Complexity Skip Prediction for H.264 through Lagrangian Cost Estimation," IEEE Transactions on Circuits and Systems for Video Technology, vol. 16, No. 2, Feb. 2006; www.rgu.ac.uk/files/h264_skippredict_richardson_final.pdf; 20 pages.

Kauff, Peter, et al., "An Immersive 3D Video-Conferencing System Using Shared Virtual Team User Environments," Proceedings of the 4th International Conference on Collaborative Virtual Environments, XP040139458; Sep. 30, 2002; http://ip.hhi.de/imedia_G3/assets/pdfs/CVE02.pdf; 8 pages.

Kazutake, Uehira, "Simulation of 3D image depth perception in a 3D display using two stereoscopic displays at different depths," Jan. 30, 2006; http://adsabs.harvard.edu/abs/2006SPIE.6055.408U; 2 pages.

Keijser, Jeroen, et al., "Exploring 3D Interaction in Alternate Control-Display Space Mappings," IEEE Symposium on 3D User Interfaces, Mar. 10-11, 2007, pp. 17-24.

Kim, Y.H., et al., "Adaptive mode decision for H.264 encoder," Electronics letters, vol. 40, Issue 19, pp. 1172-1173, Sep. 2004; 2 pages.

Klint, Josh, "Deferred Rendering in Leadwerks Engine," Copyright Leadwerks Corporation © 2008; http://www.leadwerks.com/files/Deferred_Rendering_in_Leadwerks_Engine.pdf; 10 pages.

Kolsch, Mathias, "Vision Based Hand Gesture Interfaces for Wearable Computing and Virtual Environments," A Dissertation submitted in partial satisfaction of the requirements for the degree of Doctor of Philosophy in Computer Science, University of California, Santa Barbara, Nov. 2004, 288 pages http://fulfillment.umi.com/dissertations/b7afbcb56ba72fdb14d26dfccc6b470f/1291487062/3143800.pdf.

Koyama, S., et al. "A Day and Night Vision MOS Imager with Robust Photonic-Crystal-Based RGB-and-IR," Mar. 2008, pp. 754-759; ISSN: 0018-9383; IEE Transactions on Electron Devices, vol. 55, No. 3; http://ieeexplore.ieee.org/stamp/stamp.jsp?tp=&arnumber=4455782&isnumber=4455723.

Lambert, "Polycom Video Communications," © 2004 Polycom, Inc., Jun. 20, 2004 http://www.polycom.com/global/documents/whitepapers/video_communications_h.239_people_content_polycom_patented_technology.pdf.

Lawson, S., "Cisco Plans TelePresence Translation Next Year," Dec. 9, 2008; http://www.pcworld.com/ article/155237/.html?tk=rss_news; 2 pages.

Lee, J. and Jeon, B., "Fast Mode Decision for H.264," ISO/IEC MPEG and ITU-T VCEG Joint Video Team, Doc. JVT-J033, Dec. 2003; http://media.skku.ac.kr/publications/paper/IntC/ljy_ICME2004.pdf; 4 pages.

Liu, Shan, et al., "Bit-Depth Scalable Coding for High Dynamic Range Video," SPIE Conference on Visual Communications and Image Processing, Jan. 2008; 12 pages http://www.merl.com/papers/docs/TR2007-078.pdf.

Liu, Z., "Head-Size Equalization for Better Visual Perception of Video Conferencing," Proceedings, IEEEInternational Conference on Multimedia & Expo (ICME2005), Jul. 6-8, 2005, Amsterdam, The Netherlands; http://research.microsoft.com/users/cohen/HeadSizeEqualizationICME2005.pdf; 4 pages.

Mann, S., et al., "Virtual Bellows: Constructing High Quality Still from Video," Proceedings, First IEEE International Conference on Image Processing ICIP-94, Nov. 13-16, 1994, Austin, TX; http://citeseerx.ist.psu.edu/viewdoc/summary?doi=10.1.1.50.8405; 5 pages.

Marvin Imaging Processing Framework, "Skin-colored pixels detection using Marvin Framework," video clip, YouTube, posted Feb. 9, 2010 by marvinproject, 1 page; http://www.youtube.com/user/marvinproject#p/a/u/0/3ZuQHYNIcrI.

Miller, Gregor, et al., "Interactive Free-Viewpoint Video," Centre for Vision, Speech and Signal Processing, [retrieved and printed on Feb. 26, 2009], http://www.ee.surrey.ac.uk/CVSSP/VMRG/ Publications/miller05cvmp.pdf, 10 pages.

Miller, Paul, "Microsoft Research patents controller-free computer input via EMG muscle sensors," Engadget.com, Jan. 3, 2010, 1 page; http://www.engadget.com/2010/01/03/microsoft-research-patents-controller-free-computer-input-via-em/.

Minoru from Novo is the worlds first consumer 3D Webcam, Dec. 11, 2008; http://www.minoru3d.com; 4 pages.
Mitsubishi Electric Research Laboratories, copyright 2009 [retrieved and printed on Feb. 26, 2009], http://www.merl.com/projects/3dtv, 2 pages.
Nakaya, Y., et al. "Motion Compensation Based on Spatial Transformations," IEEE Transactions on Circuits and Systems for Video Technology, Jun. 1994, Abstract Only http://ieeexplore.ieee.org/Xplore/login.jsp?url=http%3A%2F%2Fieeexplore.ieee.org%2Fiel5%2F76%2F7495%2F00305878.pdf%3Farnumber%3D305878&authDecision=-203.
National Training Systems Association Home—Main, Interservice/Industry Training, Simulation & Education Conference, Dec. 1-4, 2008; http://ntsa.metapress.com/app/home/main.asp?referrer=default; 1 page.
Oh, Hwang-Seok, et al., "Block-Matching Algorithm Based on Dynamic Search Window Adjustment," Dept. of CS, KAIST, 1997, 6 pages; http://citeseerx.ist.psu.edu/viewdoc/similar?doi=10.1.1.29.8621&type=ab.
Opera Over Cisco TelePresence at Cisco Expo 2009, in Hannover Germany—Apr. 28, 29, posted on YouTube on May 5, 2009; http://www.youtube.com/watch?v=xN5jNH5E-38; 1 page.
OptoIQ, "Vision + Automation Products—VideometerLab 2," [retrieved and printed on Mar. 18, 2010], http://www.optoiq.com/optoiq-2/en-us/index/machine-vision-imaging-processing/display/vsd-articles-tools-template.articles.vision-systems-design.volume-11.issue-10.departments.new-products.vision-automation-products.htmlhtml; 11 pages.
OptoIQ, "Anti-Speckle Techniques Uses Dynamic Optics," Jun. 1, 2009; http://www.optoiq.com/index/photonics-technologies-applications/lfw-display/lfw-article-display/363444/articles/optoiq2/photonics-technologies/technology-products/optical-components/optical-mems/2009/12/anti-speckle-technique-uses-dynamic-optics/QP129867/cmpid=EnIOptoLFWJanuary132010.html; 2 pages.
OptoIQ, "Smart Camera Supports Multiple Interfaces," Jan. 22, 2009; http://www.optoiq.com/index/machine-vision-imaging-processing/display/vsd-article-display/350639/articles/vision-systems-design/daily-product-2/2009/01/smart-camera-supports-multiple-interfaces.html; 2 pages.
OptoIQ, "Vision Systems Design—Machine Vision and Image Processing Technology," [retrieved and printed on Mar. 18, 2010], http://www.optoiq.com/index/machine-vision-imaging-processing.html; 2 pages.
Patterson, E.K., et al., "Moving-Talker, Speaker-Independent Feature Study and Baseline Results Using the CUAVE Multimodal Speech Corpus," EURASIP Journal on Applied Signal Processing, vol. 11, Oct. 2002, 15 pages http://www.clemson.edu/ces/speech/papers/CUAVE_Eurasip2002.pdf.
Payatagool, Chris, "Orchestral Manoeuvres in the Light of Telepresence," Telepresence Options, Nov. 12, 2008; http://www.telepresenceoptions.com/2008/11/orchestral_manoeuvres; 2pages.
PCT Jun. 29, 2010 PCT "International Search Report and the Written Opinion of the International Searching Authority, or the Declaration," PCT/US2010/026456, dated Jun. 29, 2010, 11 pages.
PCT May 15, 2006 International Report of Patentability dated May 15, 2006, for PCT International Application PCT/US2004/021585, 6 pages.
PCT Sep. 18, 2008 PCT International Search Report (4 pages), International Preliminary Report on Patentability (1 page), and Written Opinion of the ISA (7 pages); PCT/US2008/058079; dated Sep. 18, 2008.
PCT Oct. 10, 2009 PCT Notification of Transmittal of the International Search Report and the Written Opinion of the International Searching Authority, or the Declaration; PCT/US2009/038310; dated Oct. 10, 2009; 19 pages.
PCT Apr. 4, 2009 Notification of Transmittal of the International Search Report and the Written Opinion of the International Searching Authority, or the Declaration from PCT/US2009/001070, 17 pages.
PCT Oct. 7, 2010 PCT International Preliminary Report on Patentability mailed Oct. 7, 2010 for PCT/US2009/038310; 10 pages.
PCT Feb. 23, 2010 PCT Notification of Transmittal of the International Search Report and the Written Opinion of the International Searching Authority, or the Declaration for PCT/US2009/064061 mailed Feb. 23, 2010; 14 pages.
PCT Aug. 24, 2010 PCT International Search Report mailed Aug. 24, 2010 for PCT/US2010033880; 4 pages.
PCT Aug. 26, 2010 International Preliminary Report on Patentability mailed Aug. 26, 2010 for PCT/US2009/001070; 10 pages.
PCT Jan. 23, 2012 International Search Report and Written Opinion of the ISA from International Application Serial No. PCT/US2011/060579; 10 pages.
PCT Jan. 23, 2010 International Search Report and Written Opinion of the ISA from International Application Serial No. PCT/US2011/060584; 11 pages.
PCT Feb. 20, 2012 International Search Report and Written Opinion of the ISA from International Application Serial No. PCT/US2011/061442; 12 pages.
Perez, Patrick, et al., "Data Fusion for Visual Tracking with Particles," Proceedings of the IEEE, vol. XX, No. XX, Feb. 2004, 18 pages http://citeseer.ist.psu.edu/viewdoc/summary?doi=10.1.1.6.2480.
Pixel Tools "Rate Control and H.264: H.264 rate control algorithm dynamically adjusts encoder parameters," [retrieved and printed on Jun. 10, 2010] http://www.pixeltools.om/rate_control_paper.html; 7 pages.
Potamianos, G., et a., "An Image Transform Approach for HMM Based Automatic Lipreading," in Proceedings of IEEE ICIP, vol. 3, 1998, 5 pages http://citeseerx.ist.psu.edu/viewdoc/summary?doi=10.1.1.13.6802.
Radhika, N., et al., "Mobile Dynamic reconfigurable Context aware middleware for Adhoc smart spaces," vol. 22, 2008, http://www.acadjournal.com/2008/V22/part6/p7; 3 pages.
Rayvel Business-to-Business Products, copyright 2004 [retrieved and printed on Feb. 24, 2009], http://www.rayvel.com/b2b.html; 2 pages.
Richardson, I.E.G., et al., "Fast H.264 Skip Mode Selection Using and Estimation Framework," Picture Coding Symposium, (Beijing, China), Apr. 2006; www.rgu.ac.uk/files/richardson_fast_skip_estmation_pcs06.pdf; 6 pages.
Richardson, Iain, et al., "Video Encoder Complexity Reduction by Estimating Skip Mode Distortion," Image Communication Technology Group; [Retrieved and printed Oct. 21, 2010] 4 pages; http://www4.rgu.ac.uk/files/ICIP04_richardson_zhao_final.pdf.
Rikert, T.D., et al., "Gaze Estimation using Morphable models," IEEE International Conference on Automatic Face and Gesture Recognition, Apr. 1998; 7 pgs http://citeseer.ist.psu.edu/viewdoc/summary?doi=10.1.1.30.9472.
Robust Face Localisation Using Motion, Colour & Fusion; Proc. VIIth Digital Image Computing: Techniques and Applications, Sun C. et al (Eds.), Sydney; XP007905630; pp. 899-908; Dec. 10, 2003; http://www.cmis.csiro.au/Hugues.Talbot/dicta2003/cdrom/pdf/0899.pdf.
Satoh, Kiyohide et al., "Passive Depth Acquisition for 3D Image Displays", IEICE Transactions on Information and Systems, Information Systems Society, Tokyo, JP, Sep. 1, 1994, vol. E77-D, No. 9, pp. 949-957.
School of Computing, "Bluetooth over IP for Mobile Phones," 2005; http://www.computing.dcu.ie/wwwadmin/fyp-abstract/list/fyp_details05.jsp?year=2005&number=51470574; 1 page.
Schroeder, Erica, "The Next Top Model—Collaboration," Collaboration, The Workspace: A New World of Communications and Collaboration, Mar. 9, 2009; http//blogs.cisco.com/collaboration/comments/the_next_top_model; 3 pages.
Sena, "Industrial Bluetooth," [retrieved and printed on Apr. 22, 2009] http://www.sena.com/products/industrial_bluetooth; 1 page.
Shaffer, Shmuel, "Translation—State of the Art" presentation; Jan. 15, 2009; 22 pages.
Shi, C. et al., "Automatic Image Quality Improvement for Videoconferencing," IEEE ICASSP May 2004; http://research.microsoft.com/pubs/69079/0300701.pdf; 4 pages.
Shum, H.-Y, et al., "A Review of Image-Based Rendering Techniques," in SPIE Proceedings vol. 4067(3); Proceedings of the Conference on Visual Communications and Image Processing 2000, Jun.

20-23, 2000, Perth, Australia; pp. 2-13; https://research.microsoft.com/pubs/68826/review_image_rendering.pdf.

Smarthome, "IR Extender Expands Your IR Capabilities," [retrieved and printed on Apr. 22, 2009], http://www.smarthome.com/8121.html; 3 pages.

Soliman, H., et al., "Flow Bindings in Mobile IPv6 and NEMO Basic Support," IETF MEXT Working Group, Nov. 9, 2009, 38 pages; http://tools.ietf.org/html/draft-ietf-mext-flow-binding-04.

Sonoma Wireworks Forums, "Jammin on Rifflink," [retrieved and printed on May 27, 2010] http://www.sonomawireworks.com/forums/viewtopic.php?id=2659; 5 pages.

Sonoma Wireworks Rifflink, [retrieved and printed on Jun. 2, 2010] http://www.sonomawireworks.com/rifflink.php; 3 pages.

Soohuan, Kim, et al., "Block-based face detection scheme using face color and motion estimation," Real-Time Imaging VIII; Jan. 20-22, 2004, San Jose, CA; vol. 5297, No. 1; Proceedings of the SPIR—The International Society for Optical Engineering SPIE—Int. Soc. Opt. Eng USA ISSN: 0277-786X; XP007905596; pp. 78-88.

Sudan, Ranjeet, "Signaling in MPLS Networks with RSVP-TE-Technology Information," Telecommunications, Nov. 2000, 3 pages; http://findarticles.com/p/articles/mi_n_mOTLC/is_11_34/ai_67447072/.

Sullivan, Gary J., et al., "Video Compression—From Concepts to the H.264/AVC Standard," Proceedings IEEE, vol. 93, No. 1, Jan. 2005; http://ip.hhi.de/imagecom_G1/assets/pdfs/pieee_sullivan_wiegand_2005.pdf; 14 pages.

Sun, X., et al., "Region of Interest Extraction and Virtual Camera Control Based on Panoramic Video Capturing," IEEE Trans. Multimedia, Oct. 27, 2003; http://vision.ece.ucsb.edu/publications/04mmXdsun.pdf; 14 pages.

Super Home Inspectors or Super Inspectors, [retrieved and printed on Mar. 18, 2010] http://www.umrt.com/PageManager/Default.aspx/PageID=2120325; 3 pages.

Tan, Kar-Han, et al., "Appearance-Based Eye Gaze Estimation," In Proceedings IEEE WACV'02, 2002, 5 pages http://citeseer.ist.psu.edu/viewdoc/summary?doi=10.1.1.19.8921.

Total immersion, Video Gallery, copyright 2008-2009 [retrieved and printed on Feb. 26, 2009], http://www.t-immersion.com/en,video-gallery,36.html, 1 page.

Trucco, E., et al., "Real-Time Disparity Maps for Immersive 3-D Teleconferencing by Hybrid Recursive Matching and Census Transform," [retrieved and printed on May 4, 2010] http://server.cs.ucf.edu/~vision/papers/VidReg-final.pdf; 9 pages.

Tsapatsoulis, N., et al., "Face Detection for Multimedia Applications," Proceedings of the ICIP Sep. 10-13, 2000, Vancouver, BC, Canada; vol. 2, pp. 247-250.

Avrithis, Y., et al., "Color-Based Retrieval of Facial Images," European Signal Processing Conference (EUSIPCO '00), Tampere, Finland; Sep. 2000; http://www.image.ece.ntua.gr/~ntsap/presentations/eusipco00.ppt#256; 18 pages.

Awduche, D., et al., "Requirements for Traffic Engineering over MPLS," Network Working Group, RFC 2702, Sep. 1999, 30 pages; http://tools.ietf.org/pdf/rfc2702.pdf.

Bakstein, Hynek, et al., "Visual Fidelity of Image Based Rendering," Center for Machine Perception, Czech Technical University, Proceedings of the Computer Vision, Winter 2004, http://www.benogo.dk/publications/Bakstein-Pajdla-CVWW04.pdf; 10 pages.

Beesley, S.T.C., et al., "Active Macroblock Skipping in the H.264 Video Coding Standard," in Proceedings of 2005 Conference on Visualization, Imaging, and Image Processing, Sep. 7-9, 2005, Benidorm, Spain, Paper 480-261. ACTA Press, ISBN: 0-88986-528-0; 5 pages.

Berzin, O., et al., "Mobility Support Using MPLS and MP-BGP Signaling," Network Working Group, Apr. 28, 2008, 60 pages; http://www.potaroo.net/ietf/all-draft-berzin-malis-mpls-mobility-01.txt.

Boccaccio, Jeff; CEPro, "Inside HDMI CEC: The Little-Known Control Feature," Dec. 28, 2007; http://www.cepro.com/article/print/inside_hdmi_cec_the_little_known_control_feature; 2 pages.

Boros, S., "Policy-Based Network Management with SNMP," Proceedings of the EUNICE 2000 Summer School Sep. 13-15, 2000, p. 3.

Bücken R: "Bildfernsprechen: Videokonferenz vom Arbeitsplatz aus" Funkschau, Weka Fachzeitschriften Verlag, Poing, DE, No. 17, Aug. 14, 1986, pp. 41-43, XP002537729; ISSN: 0016-2841, p. 43, left-hand column, line 34—middle column, line 24.

Chan, Eric, et al., "Experiments on block-matching techniques for video coding," Multimedia Systems; 9 Springer-Verlag 1994, Multimedia Systems (1994) 2 pages 228-241.

Chen et al., "Toward a Compelling Sensation of Telepresence: Demonstrating a Portal to a Distant (Static) Office," Proceedings Visualization 2000; VIS 2000; Salt Lake City, UT, Oct. 8-13, 2000; Annual IEEE Conference on Visualization, Los Alamitos, CA; IEEE Comp. Soc., US, Jan. 1, 2000, pp. 327-333; http://citeseerx.ist.psu.edu/viewdoc/summary?doi=10.1.1.35.1287.

Chen, Jason, "iBluetooth Lets iPhone Users Send and Receive Files Over Bluetooth," Mar. 13, 2009; http://i.gizmodo.com/5169545/ibluetooth-lets-iphone-users-send-and-receive-files-over-bluetooth; 1 page.

Chen, Qing, et al., "Real-time Vision-based Hand Gesture Recognition Using Haar-like Features," Instrumentation and Measurement Technology Conference, Warsaw, Poland, May 1-3, 2007, 6 pages; http://www.google.com/url?sa=t&source=web&cd=1&ved=0CB4QFjAA&url=http%3A%2F%2Fciteseerx.ist.psu.edu%2Fviewdoc%2Fdownload%3Fdoi%3D10.1.1.93.103%26rep%3Drep1%26type%3Dpdf&ei=A28RTLKRDeftnQeXzZGRAw&usg=AFQjCNHpwj5MwjgGp-3goVzSWad6CO-Jzw.

Chien et al., "Efficient moving Object Segmentation Algorithm Using Background Registration Technique," IEEE Transactions on Circuits and Systems for Video Technology, vol. 12, No. 7, Jul. 2002, 10 pages.

Cisco: Bill Mauchly and Mod Marathe; UNC: Henry Fuchs, et al., "Depth-Dependent Perspective Rendering," Apr. 15, 2008; 6 pages.

Costa, Cristina, et al., "Quality Evaluation and Nonuniform Compression of Geometrically Distorted Images Using the Quadtree Distorion Map," EURASIP Journal on Applied Signal Processing, Jan. 7, 2004, vol. 2004, No. 12; © 2004 Hindawi Publishing Corp.; XP002536356; ISSN: 1110-8657; pp. 1899-1911; http://downloads.hindawi.com/journals/asp/2004/470826.pdf.

Criminisi, A., et al., "Efficient Dense-Stereo and Novel-view Synthesis for Gaze Manipulation in One-to-one Teleconferencing," Technical Rpt MSR-TR-2003-59, Sep. 2003 [retrieved and printed on Feb. 26, 2009], http://research.microsoft.com/pubs/67266/criminis_techrep2003-59.pdf, 41 pages.

Cumming, Jonathan, "Session Border Control in IMS, An Analysis of the Requirements for Session Border Control in IMS Networks," Sections 1.1, 1.1.1, 1.1.3, 1.1.4, 2.1.1, 3.2, 3.3.1, 5.2.3 and pp. 7-8, Data Connection, 2005.

Daly, S., et al., "Face-based visually-optimized image sequence coding," Image Processing, 1998. ICIP 98. Proceedings; 1998 International Conference on Chicago, IL; Oct. 4-7, 1998, Los Alamitos; IEEE Computing; vol. 3, Oct. 4, 1998; ISBN: 978-0-8186-8821-8; XP010586786; pp. 443-447.

Diaz, Jesus, "Zcam 3D Camera is Like Wii Without Wiimote and Minority Report Without Gloves," Dec. 15, 2007; http://gizmodo.com/gadgets/zcam-depth-camera-could-be-wii-challenger/zcam-3d-camera-is-like-wii-without-wiimote-and-minority-report-without-gloves-334426.php; 3pages.

Diaz, Jesus, iPhone Bluetooth File Transfer Coming Soon (Yes!); Jan. 26, 2009; http://i.gizmodo.com/5138797/iphone-bluetooth-file-transfer-coming-soon-yes; 1page.

DVE Digital Video Enterprises, "DVE Tele-Immersion Room," [retrieved and printed on Feb. 5, 2009] http://www.dvetelepresence.com/products/immersion_room.asp; 2 pages.

Dynamic Displays, copyright 2005-2008 [retrieved and printed on Feb. 24, 2009] http://www.zebraimaging.com/html/lighting_display.html, 2 pages.

ECmag.com, "IBS Products," Published Apr. 2009; http://www.ecmag.com/index.cfm?fa=article&articleID=10065; 2 pages.

Eisert, Peter, "Immersive 3-D Video Conferencing: Challenges, Concepts and Implementations," Proceedings of SPIE Visual Communications and Image Processing (VCIP), Lugano, Switzerland, Jul. 2003; 11 pages; http://iphome.hhi.de/eisert/papers/vcip03.pdf.

eJamming Audio, Learn More; [retrieved and printed on May 27, 2010] http://www.ejamming.com/learnmore/; 4 pages.

Electrophysics Glossary, "Infrared Cameras, Thermal Imaging, Night Vision, Roof Moisture Detection," [retrieved and printed on Mar. 18, 2010] http://www.electrophysics.com/Browse/Brw_Glossary.asp; 11 pages.

Farrukh, A., et al., Automated Segmentation of Skin-Tone Regions in Video Sequences, Proceedings IEEE Students Conference, ISCON_apos_02; Aug. 16-17, 2002; pp. 122-128.

Fiala, Mark, "Automatic Projector Calibration Using Self-Identifying Patterns," National Research Council of Canada, Jun. 20-26, 2005; http://www.procams.org/procams2005/papers/procams05-36.pdf; 6 pages.

Foote, J., et al., "Flycam: Practical Panoramic Video and Automatic Camera Control," in Proceedings of IEEE International Conference on Multimedia and Expo, vol. III, Jul. 30, 2000; pp. 1419-1422; http://citeseerx.ist.psu.edu/viewdoc/versions?doi=10.1.1.138.8686.

Freeman, Professor Wilson T., Computer Vision Lecture Slides, "6.869 Advances in Computer Vision: Learning and Interfaces," Spring 2005; 21 pages.

Garg, Ashutosh, et al., "Audio-Visual ISpeaker Detection Using Dynamic Bayesian Networks," IEEE International Conference on Automatic Face and Gesture Recognition, 2000 Proceedings, 7 pages; http://www.ifp.illinois.edu/~ashutosh/papers/FG00.pdf.

Gemmell, Jim, et al., "Gaze Awareness for Video-conferencing: A Software Approach," IEEE MultiMedia, Oct.-Dec. 2000; vol. 7, No. 4, pp. 26-35.

Geys et al., "Fast Interpolated Cameras by Combining a GPU Based Plane Sweep With a Max-Flow Regularisation Algorithm," Sep. 9, 2004; 3D Data Processing, Visualization and Transmission 2004, pp. 534-541.

Gotchev, Atanas, "Computer Technologies for 3D Video Delivery for Home Entertainment," International Conference on Computer Systems and Technologies; CompSysTech, Jun. 12-13, 2008; http://ecet.ecs.ru.acad.bg/cst08/docs/cp/Plenary/P.1.pdf; 6 pages.

Gries, Dan, "3D Particles Experiments in AS3 and Flash CS3, Dan's Comments," [retrieved and printed on May 24, 2010] http://www.flashandmath.com/advanced/fourparticles/notes.html; 3 pages.

Guernsey, Lisa, "Toward Better Communication Across the Language Barrier," Jul. 29, 1999; http://www.nytimes.com/1999/07/29/technology/toward-better-communication-across-the-language-barrier.html; 2 pages.

Guili, D., et al., "Orchestra!: A Distributed Platform for Virtual Musical Groups and Music Distance Learning over the Internet in JavaTM Technology" ; [retrieved and printed on Jun. 6, 2010] http://ieeexplore.ieee.org/stamp/stamp.jsp?tp=&arnumber=778626; 2 pages.

Gundavelli, S., et al., "Proxy Mobile IPv6," Network Working Group, RFC 5213, Aug. 2008, 93 pages; http://tools.ietf.org/pdf/rfc5213.pdf.

Gussenhoven, Carlos, "Chapter 5 Transcription of Dutch Intonation," Nov. 9, 2003, 33 pages; http://www.ru.nl/publish/pages/516003/todisun-ah.pdf.

Gvili, Ronen et al., "Depth Keying," 3DV System Ltd., [Retrieved and printed on Dec. 5, 2011] 11 pages; http://research.microsoft.com/en-us/um/people/eyalofek/Depth%20Key/DepthKey.pdf.

Habili, Nariman, et al., "Segmentation of the Face and Hands in Sign Language Video Sequences Using Color and Motion Cues" IEEE Transaction on Circuits and Systems for Video Technology, IEEE Service Center, vol. 14, No. 8, Aug. 1, 2004; ISSN: 1051-8215; XP011115755; pp. 1086-1097.

Hammadi, Nait Charif et al., "Tracking the Activity of Participants in a Meeting," Machine Vision and Applications, Springer, Berlin, De Lnkd—DOI:10.1007/S00138-006-0015-5, vol. 17, No. 2, May 1, 2006, pp. 83-93, XP019323925 http://citeseerx.ist.psu.edu/viewdoc/summary?doi=10.1.1.106.9832.

He, L., et al., "The Virtual Cinematographer: A Paradigm for Automatic Real-Time Camera Control and Directing," Proc. SIGGRAPH, © 1996; http://research.microsoft.com/en-us/um/people/lhe/papers/siggraph96.vc.pdf; 8 pages.

* cited by examiner

SYSTEM AND METHOD FOR MANAGING OPTICS IN A VIDEO ENVIRONMENT

TECHNICAL FIELD

This disclosure relates in general to the field of video and, more particularly, to managing optics in a video environment.

BACKGROUND

Video services have become increasingly important in today's society. In certain architectures, service providers may seek to offer sophisticated video conferencing services for their end users. The video conferencing architecture can offer an "in-person" meeting experience over a network. Video conferencing architectures can deliver real-time, face-to-face interactions between people using advanced visual, audio, and collaboration technologies. Some issues have arisen in video conferencing scenarios where mechanical parts can obscure portions of a video conference. Deficient effective viewpoints can distort the video images being sent to participants in a video conference. The ability to optimize video environments provides a significant challenge to system designers, device manufacturers, and participants of video conferences.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An apparatus is provided in one example and includes a camera configured to receive image data associated with an end user involved in a video session. The apparatus further includes a display configured to interface with the camera. The camera and the display cooperate such that the apparatus can initiate the video session involving the end user, and activate a retracting mechanism configured to move the camera such that the camera is retracted from a view of the display and the camera moves to an inactive state.

In more particular embodiments, the apparatus can include a housing unit, which includes the retracting mechanism. The retracting mechanism includes a motor configured to provide a retracting force to the camera. The apparatus can further be configured to activate the retracting mechanism such that the camera is moved to a position in the view of the display and the camera moves to an active state.

In yet other embodiments, the display includes a perimeter configured to illuminate when the video session is initiated. The apparatus can also include a motor control element configured to signal a motor to provide a retracting force to the camera. The retracting mechanism includes a sensor configured to monitor a position of the camera. The apparatus can also include a controlling element configured to activate the retracting mechanism; and a retracting module configured to receive a wireless signal in order to activate the retracting mechanism. In more specific implementations, the apparatus can include a telescopic stand coupled to the display and configured to be adjusted in a horizontal plane such that the display moves in concert with adjustments to the telescopic stand.

Example Embodiments

Figure 1A:
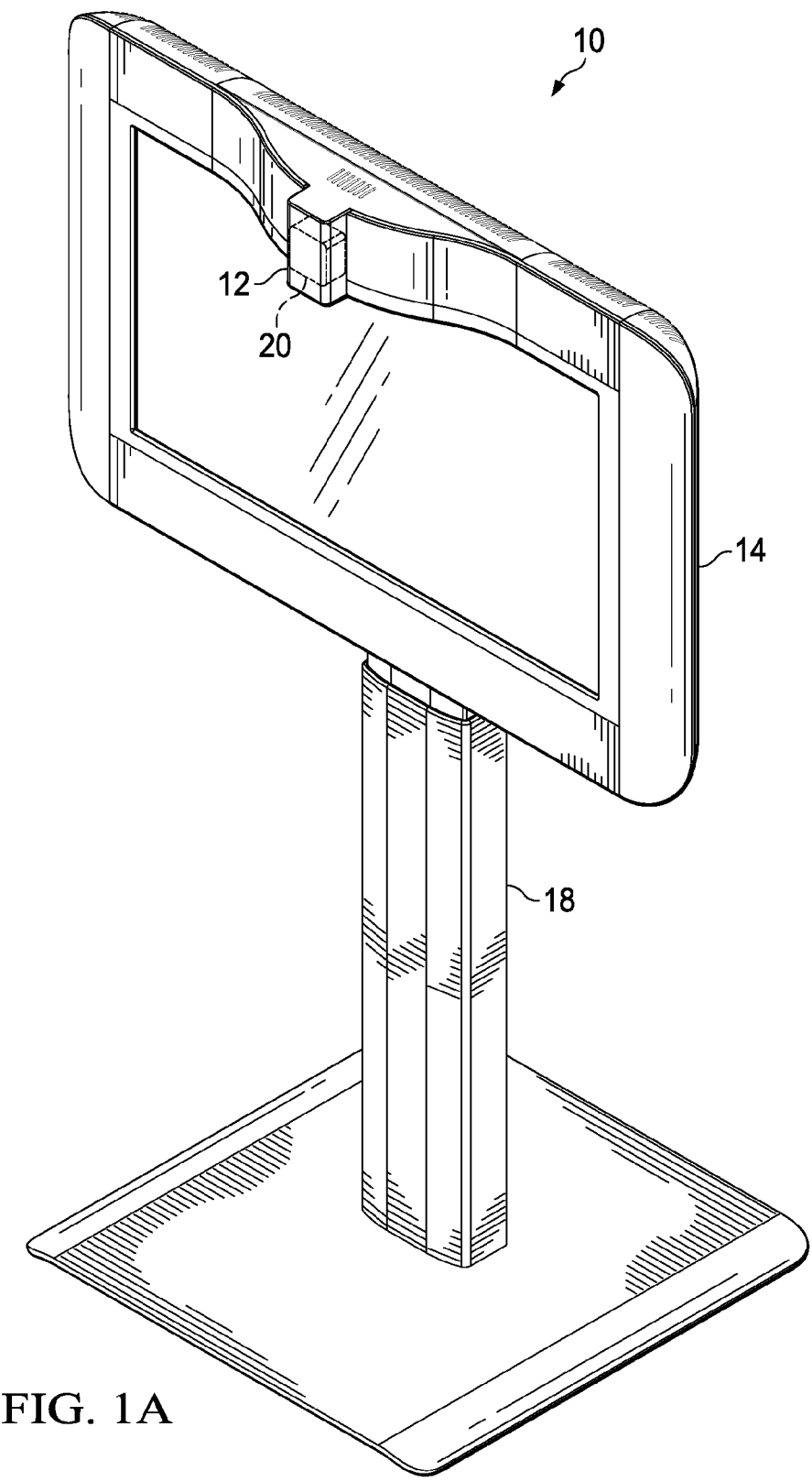
FIG. 1A is a simplified schematic diagram of a system for managing optics in a video environment in accordance with one embodiment of the present disclosure.
Figure 1B:
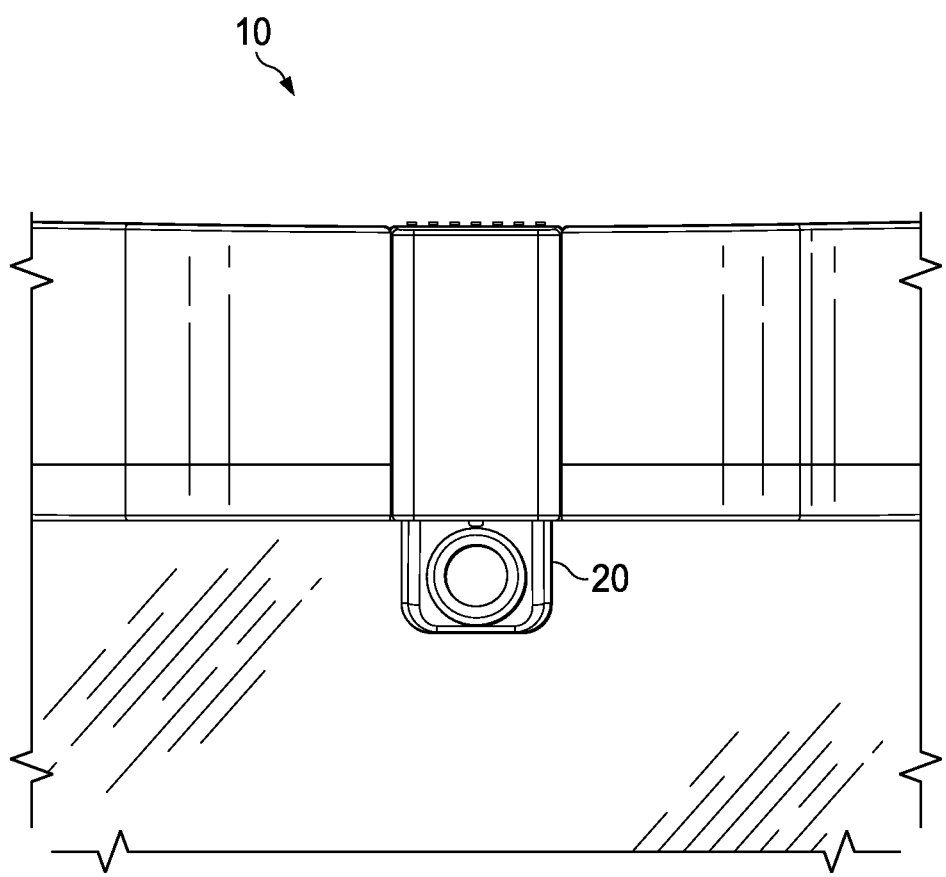
FIGS. 1B-1D are simplified schematic diagrams illustrating various example operations associated with the system.

Turning to FIGS. 1A-1B, FIGS. 1A-1B are simplified schematic diagrams of a system 10 for providing a retracting camera 20 in a video conferencing environment. FIGURE 1A includes a housing unit 12 and a display 14. In one particular implementation, display 14 may include a stand 18, which can support or otherwise stabilize display 14. FIG. 1B illustrates camera 20 in a deployed state. In accordance with one example embodiment of system 10, a retractable mechanism allows camera 20 to drop down in front of display 14 when video conferencing is initiated. When video conferencing is terminated, a retractable mechanism allows camera 20 to retract from in front of display 14 into housing unit 12.

Returning to FIG. 1A, camera 20 is illustrated in a retracted state (i.e., an inactive state) such that camera 20 is appropriately stowed in housing unit 12. The term 'inactive state' is meant to connote any type of dormant status such that camera 20 is not engaged, or being used by the architecture. This inactive state can be the result of a retraction operation, or a general movement of camera 20 such that it does not block a view for a given end user. Also, as used herein in this Specification, the term 'housing unit' can include mechanical elements to facilitate its retracting function (e.g., inclusive of hooks, springs, pins, latches, pinions, gears, screws, levers, snaps, Velcro, etc.). In other embodiments, camera 20 can be retracted in a motorized fashion, using any type of electronics, cable system, etc. As used herein in this Specification, the term 'retraction mechanism' is meant to include any type of element capable of reeling, pulling, or providing a general force that moves an object in any variant of a direction. Such a direction may be upward, lateral (where a camera and an optics element would be mounted on the side of a display), downward (where a camera and an optics element would be mounted on the bottom of a display), or any other suitable angle. For purposes of discussion, a set of example retracting approaches are described below with reference to FIGS. 1B-1D.

Note that in most video conferencing systems, a video camera is mounted such that it hangs in front of its associated display, where this arrangement can obscure portions of the display area. For example, in the case of 65" screens, a small percentage of the display area is obscured. The benefit is that the video camera can be close to the position of the displayed person's eyes, thereby giving a better apparent eye contact than if the video camera were mounted farther above (e.g., on a bezel). When this scenario is moved to other types of video conferencing systems (e.g., a desktop system, where the display may be 24"), and the user sits about two-three feet from the display, several problems occur. First, the video camera covers an objectionably larger percentage of the display. Hence, the camera installation (collectively: the custom brackets, the camera, the wires, etc.) obstruct the view of the display. Furthermore, the display is not useful as a general-purpose computer display.

In addition, it should be noted that other problems exist with personal use video conferencing architectures (e.g., webcams). For example, a given end user may be afraid that a counterparty is routinely watching them, regardless of whether a video session is occurring. Also, camera lenses collect dust that inhibits the image quality of the captured video data. Further, most low-cost cameras have small apertures, and typically have noise problems in low light.

System 10 can resolve these issues (and others) in providing an elegant configuration that accommodates several types of users, and that captures optimal image data. By utilizing a retractable camera 20 (e.g., as shown in FIG. 1B), system 10 can offer a viable solution for capturing an ideal field of view of a subject. Furthermore, such an arrangement can improve eye contact for the end user of display 14. In operational terms, when camera 20 is not visible to the audience, the architecture is in its inactive state, which positions camera 20 out of the way of display 14. In the inactive state, an end user has an unobstructed view of display 14. When the camera 20 is retracted out of the way of display 14, system 10 looks and operates as a display for other potential video applications (e.g., in personal computing). Further, when camera 20 is retracted in housing unit 12, an audience can intuitively appreciate that camera 20 is no longer recording or transmitting images of the audience or their surroundings. Moreover, housing unit 12 provides physical protection from dust, dirt, or physical contact with the retracted camera 20.

Figure 1C:
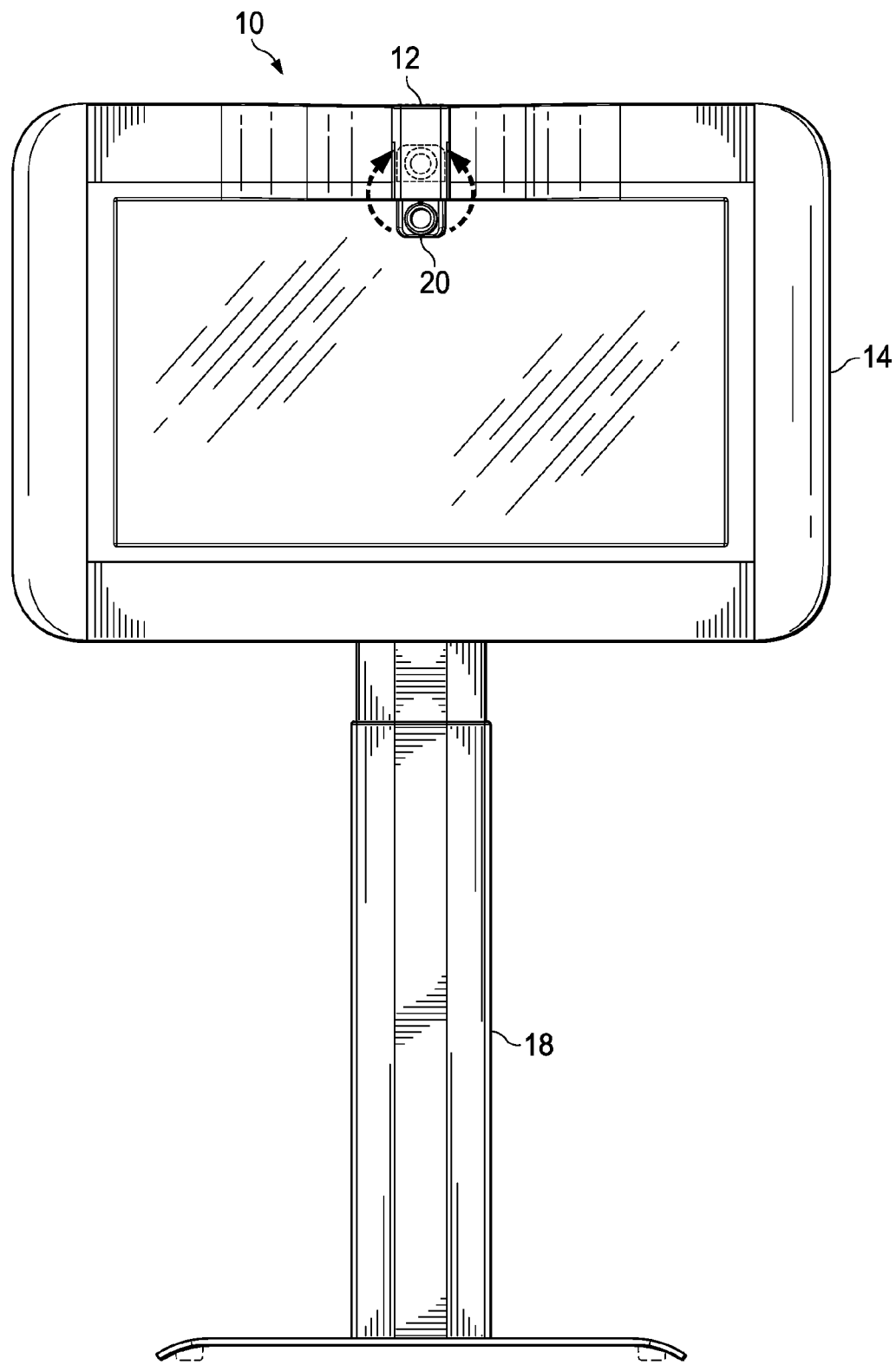
Figure 1D:
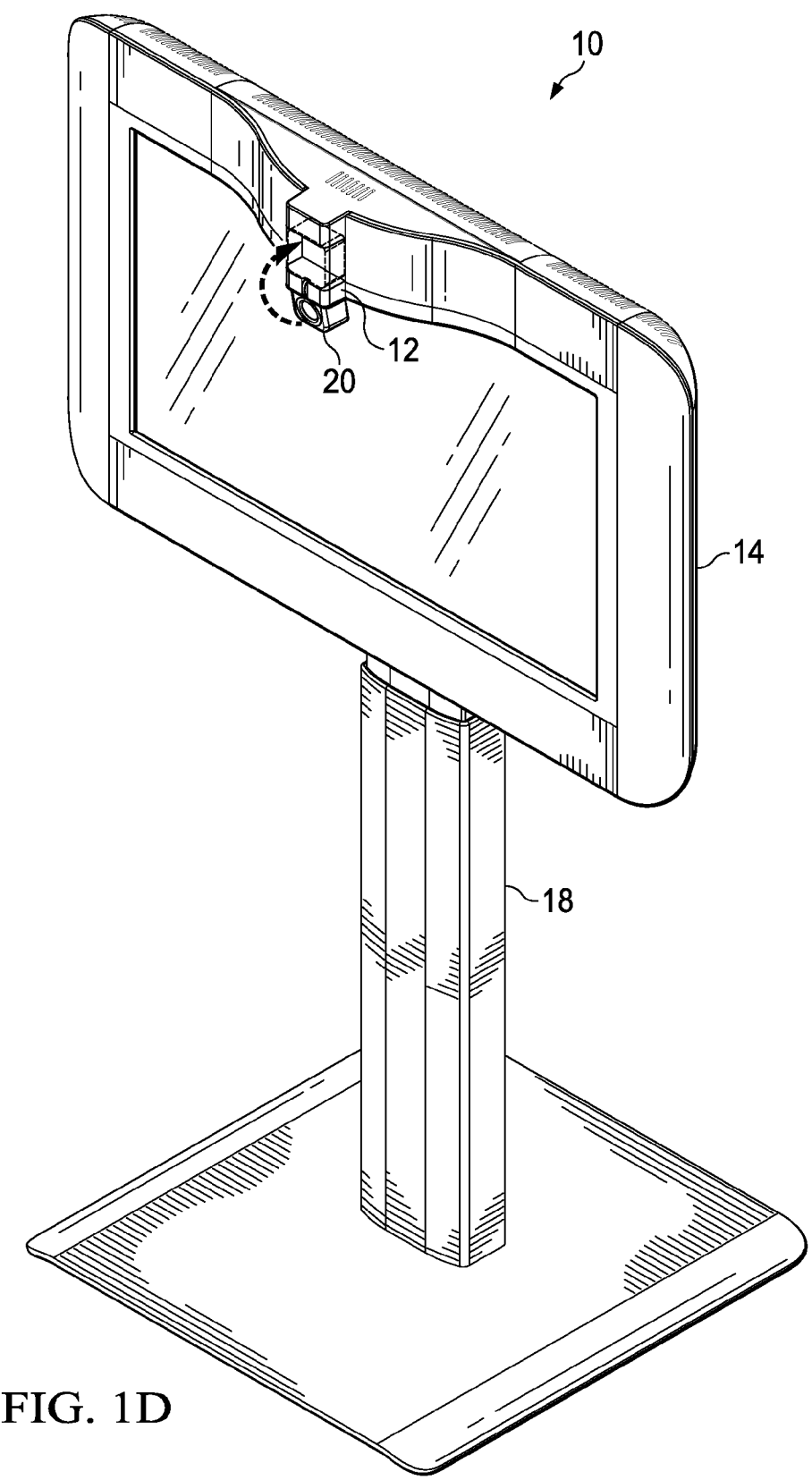

Turning to FIGS. 1C-1D, these FIGURES are simplified schematic diagrams illustrating possible approaches for retracting camera 20 into housing unit 12. In FIG. 1C, camera 20 is retracted rotationally (e.g., on a pivot) into housing unit 12. Camera 20 may be rotated clockwise or counterclockwise as indicated by dashed lines. Similarly, as illustrated in FIG. 1D, camera 20 may be retracted rotationally toward an audience (i.e., away from display 14) as indicated by dashed lines. Although a rotational retraction is illustrated in three specific directions, camera 20 may be rotationally retracted into housing unit 12 in a variant of directional planes and suitable angles.

Figure 1E:
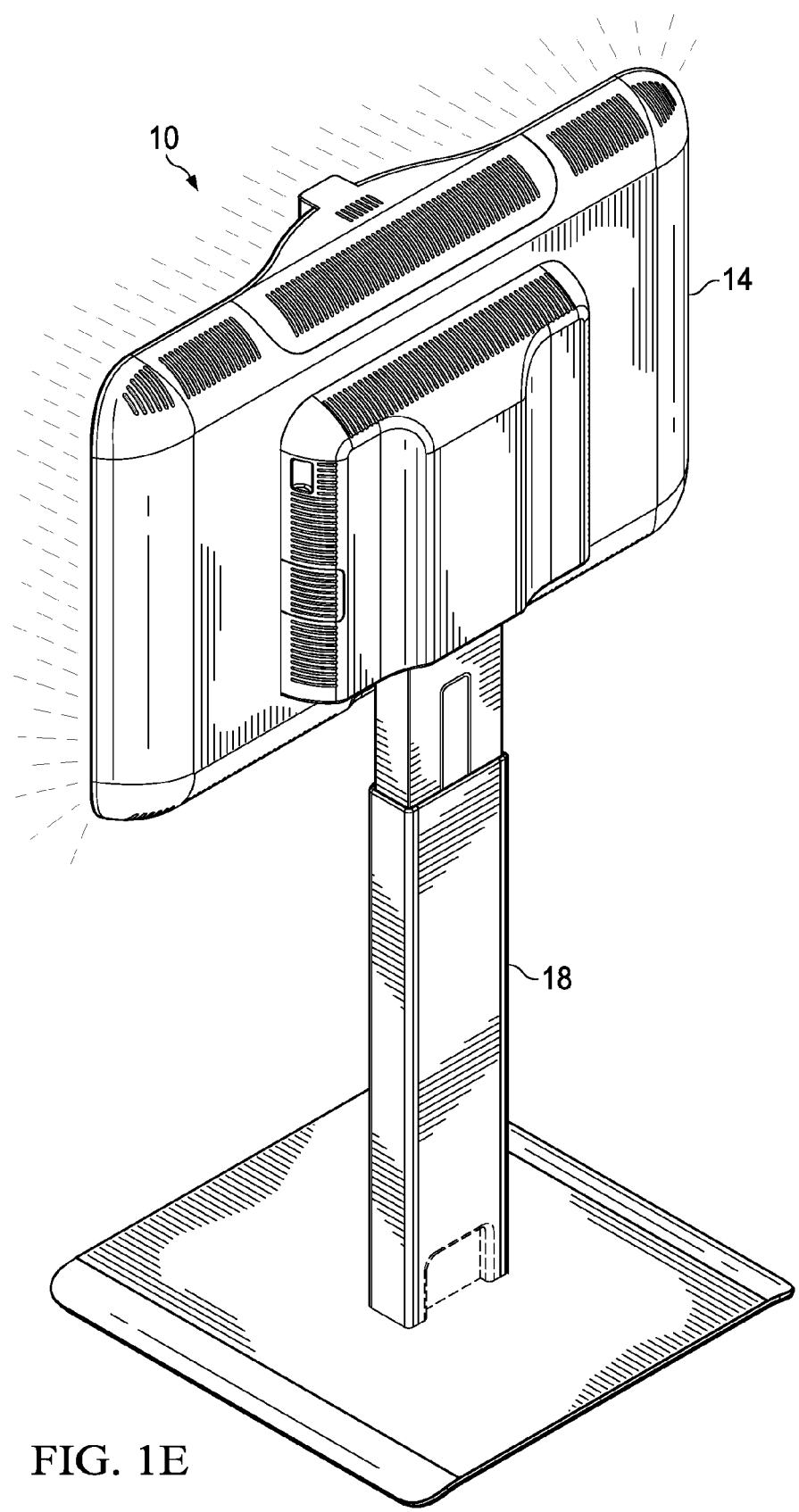
FIG. 1E is a simplified schematic diagram illustrating example illuminating elements associated with the system for managing optics in a video environment.

In one particular implementation, as illustrated in FIG. 1E, the perimeter of display 14 is configured to illuminate when a video conference is initiated and, further, remains illuminated while the video conference is in progress. In one particular implementation, illuminating the perimeter of display 14 signals that a video conference is in progress. When a video conference is terminated, the perimeter of display 14 dulls. In one particular implementation, a dulled perimeter of display 14 indicates that display 14 is operating as a display for other potential video applications (e.g., in personal computing). Although display 14 has been described as having a perimeter that illuminates, other aspects of the display could be illuminated and dulled to indicate additional functional states of display 14. Additionally, display 14 can have illuminating elements of different colors, which can signal different events. For example, a red illuminating perimeter may be indicative of an end user seeking not to be disturbed during the video conference. Similarly, a green illuminating perimeter may signal to other users that the end user in the video conference can receive communications. A blinking perimeter may be indicative of a video call about to end, or to begin.

Any such coloring schemes, or other coloring/intermittent flashing schemes, are encompassed within the broad teachings of the present disclosure.

Before turning to details and operational capabilities of this architecture, a brief discussion is provided about some of the infrastructure of FIGS. 1A-1E. Display 14 offers a screen at which video data can be rendered for the end user. Note that as used herein in this Specification, the term 'display' is meant to connote any element that is capable of delivering an image, video data, text, sound, audiovisual data, etc. to an end user during a video session. This would necessarily be inclusive of any panel, plasma element, television, monitor, electronic surface, computer interface, screen, or any other suitable element that is capable of delivering such information. Note also that the term 'video session' is meant to connote any type of media or video session (or audio-video) provided in any protocol or format that could be provided in conjunction with display 14. Similarly, the term 'image data' is meant to include any type of image information that can be captured by camera 20.

In one particular example, camera 20 is an Internet protocol (IP) camera configured to record, maintain, cache, receive, and/or transmit data. This could include transmitting packets over an IP network to a suitable next destination. Recorded files could be stored in camera 20 itself, or provided in some suitable storage area (e.g., a database, server, etc.). In one particular instance, camera 20 is its own separate network device and it has a separate IP address. Camera 20 could be a wireless camera, a high-definition camera, or any other suitable camera device configured to capture image information associated with a participant positioned in front of display 14.

Camera 20 can be configured to capture the image data and send it to any suitable processing platform, or to a server attached to the network for processing and for subsequent distribution to remote sites (e.g., to other participants and the video session). The server could include an image-processing platform such as a media experience engine (MXE), which is a processing element that can attach to the network. The MXE can simplify media sharing across the network by optimizing its delivery in any format for any device. It could also provide media conversion, real-time postproduction, editing, formatting, and network distribution for subsequent communications. The system can utilize real-time face and eye recognition algorithms to detect the position of the participant's eyes in a video session. Any type of image synthesizer (e.g., within the server, at a remote location, somewhere in the network, etc.) can process the video data captured by camera 20.

Figure 2:
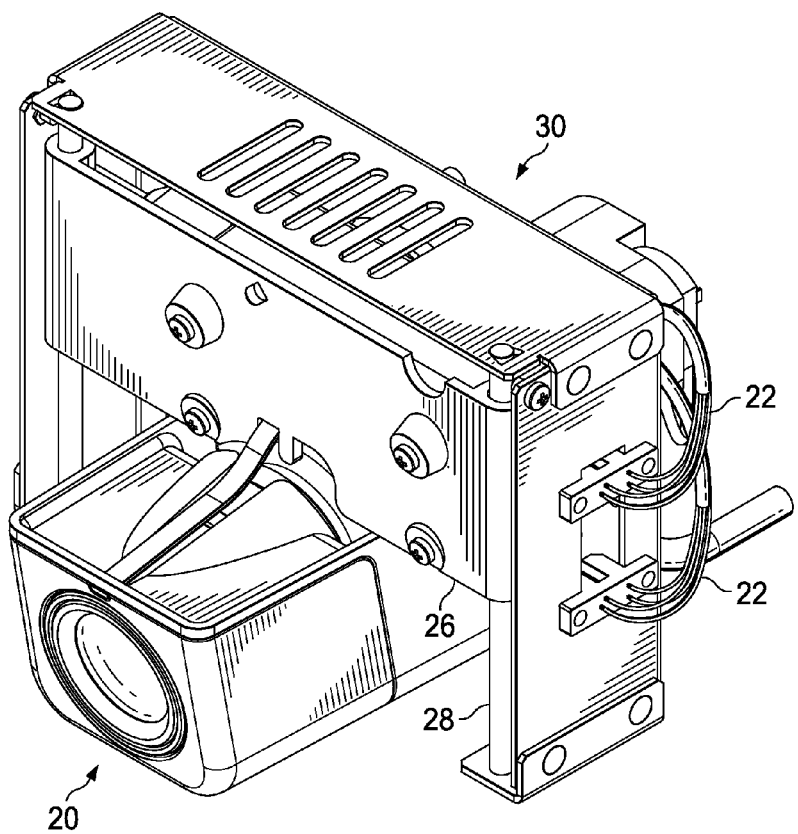
FIG. 2 is a simplified schematic diagram illustrating one possible design for a camera associated with the system.

FIG. 2 is a simplified schematic diagram associated with one particular retracting mechanism 30. This particular implementation includes camera 20, a set of position sensors 22, a mounting unit 26, and a set of guides 28. In one particular arrangement, these elements can be included within (or be provided in conjunction with) housing unit 12, which can be configured to store camera 20. Camera 20 is suitably coupled to mounting unit 26. Mounting unit 26 interfaces with guides 28 in order to move camera 20 to various positions (e.g., retracted and deployed). Position sensors 22 can interface with mounting unit 26 and camera 20 to evaluate when camera 20 is positioned at a desired location. In one particular implementation, position sensors 22 (e.g., a high sensor and a low sensor) can be evaluated in order to determine when camera 20 is in the up position (i.e., when camera 20 is in an inactive state) or in the down position (i.e., camera 20 is in a deployed (inactive) state). A motor element can be implemented to create a force (e.g., a rotational force) that is translated in order to manipulate mounting unit 26 and camera 20 in a certain direction (e.g., raise and lower). In one particular implementation, the motor element can be performed by a linkage drive; however, other motor elements are equally suitable. Alternatives include, a linear actuator, a worm gear system, or any other suitable mechanism. Moreover, although camera 20 is described as being suitably coupled to mounting unit 26, camera 20 could easily be designed to provide the interface functions between mounting unit 26 and guides 28. Thus, camera 20 and mounting unit 26 could be implemented as a single element.

It is imperative to note that retracting mechanism 30 of FIG. 2 is not solely limited to the mounting unit 26, guides 28, and position sensors 22 arrangement discussed above. For example, an air system could be used in conjunction with any of the previously discussed objects in order to quietly release camera 20 from its retracted position. Other examples could include spring mechanisms that secure camera 20 in place and/or allow camera 20 to extend downward. In other embodiments involving more mechanical systems, a simple latching mechanism could be used to restrain camera 20 at its designated location. Virtually any type of retracting and/or storage mechanism could be employed. For example, a simple hand-crank could be used to retract and, subsequently, store camera 20. Other architectures could be similarly manual, where an individual could simply push camera 20 up and away from display 14 when camera 20 is not being used. In this sense, an individual can rotate camera 20 (e.g., on a pivot) such that it can be stored when not in use. Any of these viable alternatives are included within the broad term 'retracting mechanism' as used herein in this Specification.

Retracting mechanism 30 outlined above has several pragmatic advantages associated with video conferencing systems. For example, by employing such a mechanism, the underlying display can be used for various other purposes (e.g., general personal computing applications, television uses, presentations, etc.). Also, the retractable feature minimizes dust and debris from forming on the video optics generally. Furthermore, based on its apparent physical state, retraction mechanism 30 can provide a clear indication that the video conferencing system is in use. As video conferencing architectures have become more prevalent, certain users have developed an awareness that camera 20 (e.g., regardless of its operational status) may be tracking their movements. When a camera is retracted (and suitably stored), this physical cue offers an assurance that an individual's movement is not being captured by camera 20.

Figure 3:
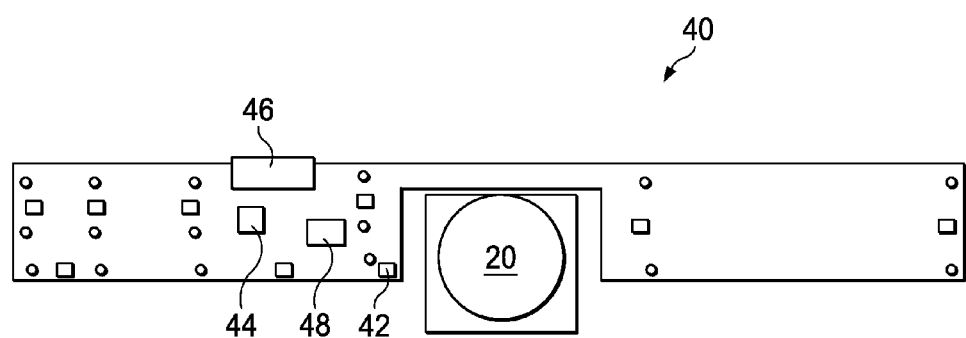
FIG. 3 is a simplified schematic diagram illustrating one potential arrangement associated with the camera of FIG. 2.

FIG. 3 is a simplified schematic diagram of a printed circuit board (PCB) 40 for offering a retracting camera in a video environment. FIG. 3 includes camera 20, a position sensor 42, an audio multiplexer 44, an audio port 46, and a motor controller 48. A codec of PCB 40 can send a signal to motor controller 48 to initiate a motor element to manipulate camera 20 (e.g., deploy and retract). Position sensor 42, through the codec, can send a signal to motor controller 48 that camera 20 is located in a desired position. Motor controller 48 can also signal the motor element to terminate the force it is applying to camera 20. The codec can send signals to motor controller 48 to both deploy and retract camera 20. Likewise, motor controller 48 can signal a motor element to deploy and retract camera 20. Further, PCB 40 may include an audio multiplexer 44 that suitably combines audio signals received from multiple microphones deployed in system 10. Audio port 46 interfaces with audio multiplexer 44 to send audio signals from PCB to suitable receiver circuits or elements not integrated on PCB 40. Audio port 46 may also be configured to transmit various other signals (e.g., data, power, etc.) Further, audio port 46 may also receive various signals (e.g., audio, data, power, etc.) from sources not integrated on PCB 40.

Figure 4:
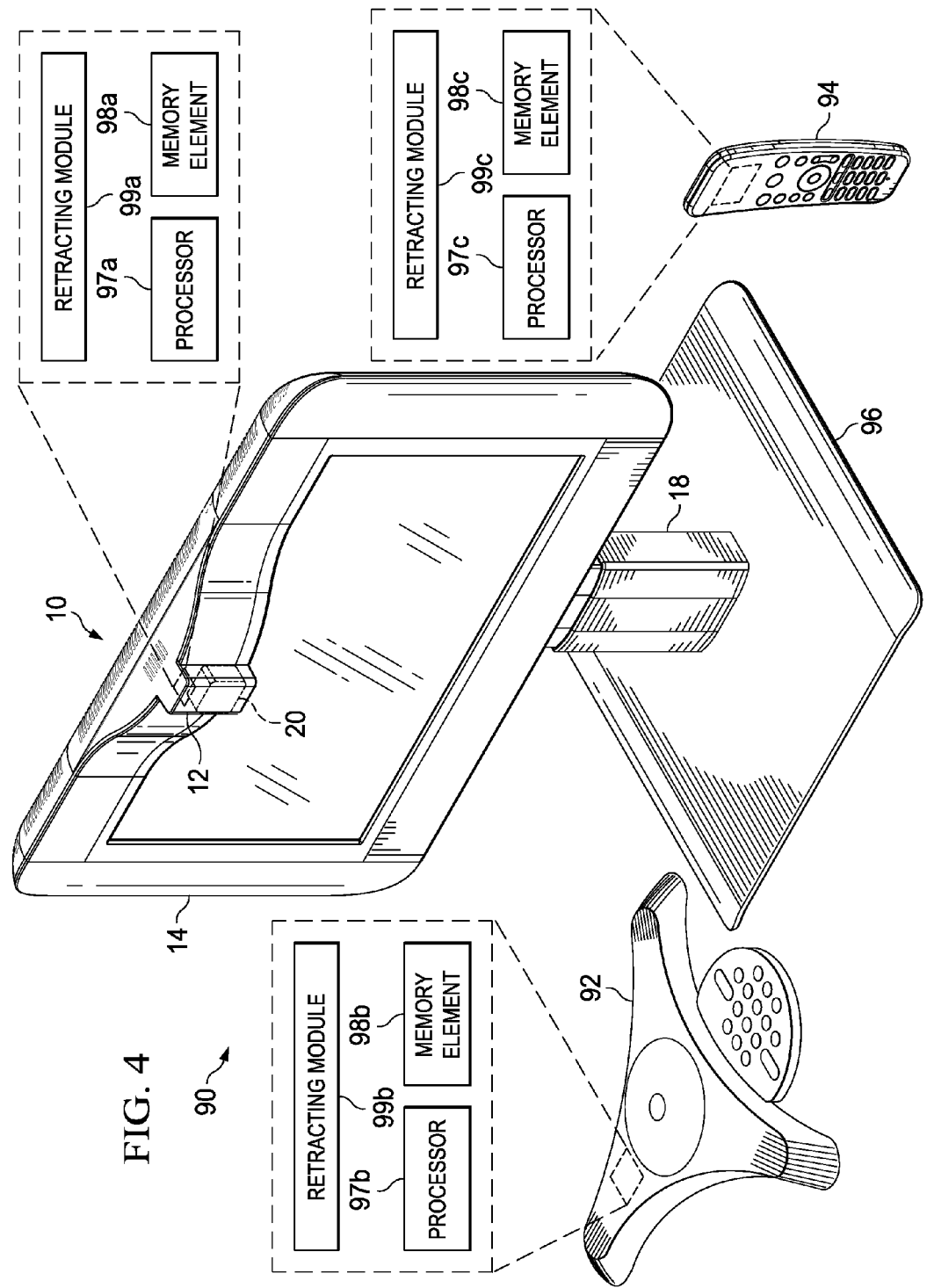
FIG. 4 is a simplified schematic diagram of a system for controlling optics in a video conferencing environment in accordance with another embodiment of the present disclosure.

FIG. 4 is a simplified schematic diagram of a system 90 for managing optics in a video environment. In addition to the components discussed previously, FIG. 4 also includes a telescopic supporting stand 96, a touchpad 92, and a remote control 94. Telescopic supporting stand 96 can be suitably coupled to display 14 for adjustment in a horizontal plane such that display 14 moves in concert with adjustments to telescopic supporting stand 96. Touchpad 92 and remote control 94 are 'controlling elements' that may have overlapping functions, complementary functions, or completely different functions. In one particular example, each of touchpad 92 and remote control 94 can operate the retraction system associated with camera 20. Housing unit 12, touchpad 92, and remote control 94 may include a respective processor 97a-c, a memory element 98a-c, and a retracting module 99a-c. Note that retracting modules 99a-c can be tasked with deployment operations in addition to retraction activities.

Touchpad 92 may include audio features, sharing features (e.g., for sharing data, documents, applications, etc. between video conferencing participants), application features (e.g., where the applications are being executed in conjunction with a video conference), calling/connection features (e.g., transferring calls, bridging calls, initiating calls, connecting parties, receiving calls, etc.) or any other end-user features that can be applicable to a video conference. In one particular arrangement, touchpad 92 and remote control 94 are wireless; however, touchpad 92 and remote control 94 could alternatively be implemented with suitable wires, cables, infrared, connections, etc. in order to facilitate the operations thereof.

In operation of one example scenario, an individual can schedule a video conferencing session with a counterparty. This scheduling can be inclusive of designating appropriate times, reminders, location information, invitees, applications to be used during the video conference, etc. The individual uses a touchpad (e.g., touchpad 92 of FIG. 4) to initiate the call. In one particular example, initiating the call triggers housing unit 12 to begin deploying camera 20. For example, touchpad 92 can interface with housing unit 12 and, thereby, receive signals from housing unit 12. In other instances, housing unit 12 can be synchronized with a calendar function such that it (intuitively or automatically) understands when to deploy camera 20 at designated times.

In another embodiment, touchpad 92 can be used to trigger the deployment of camera 20 before the call is initiated. Note that the terms 'trigger', 'initiate', and 'activate' are simply connoting some type of signal being provided to any of the elements discussed herein. This could include simple ON/OFF signaling, retracting activities, deployment activities, etc., all of which could apply to individual components of the described architectures, or collectively to multiple components such that they move in concert with a single signal. Subsequently, the video conference ends, and the individual can use touchpad 92 to retract/store camera 20.

Figure 5:
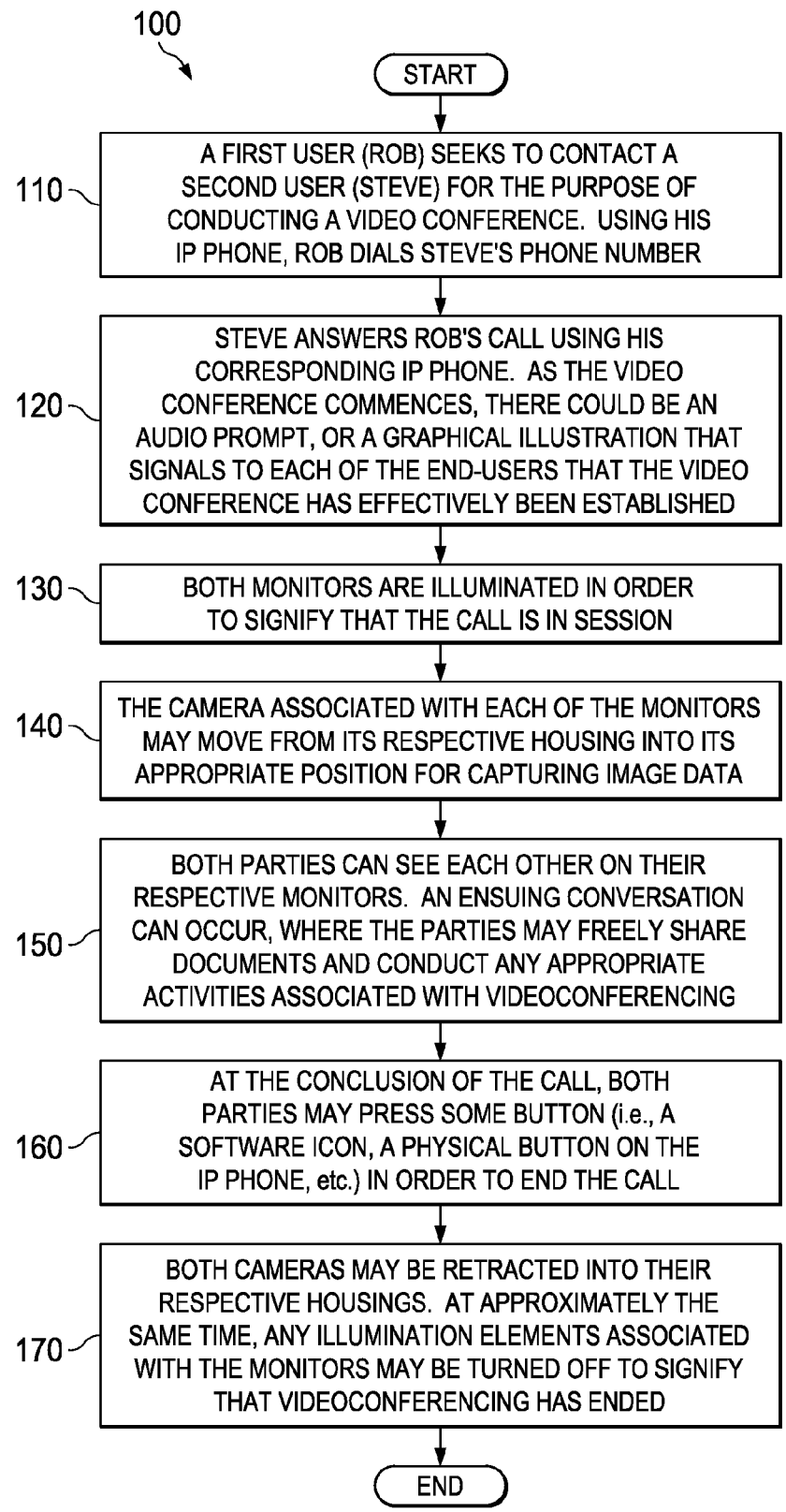
FIGS. 5-6 are simplified flow diagrams illustrating potential operations associated with the system.

FIG. 5 is a simplified flowchart 100 illustrating one example embodiment associated with system 10. The flow begins at 110, where a first user seeks to contact a second user for the purpose of conducting a video conference. Using a video capable terminal (e.g., an IP Phone, personal computer, etc.), the first user enters (e.g., dials) the second user's contact information (e.g., phone number). Note that the video conference could have been prescheduled such that a Calendar Invite, a WebEx notification, a Calendar Reminder, etc. could have triggered the first user's contacting activity.

At 120, the second user's video capable terminal (e.g., IP Phone, personal computer, etc.) receives the request to commence a video conference and the second user answers the call. The video conference commences once the second user answers the video capable terminal. Once the video conference commences, there could be an audio prompt, or a graphical illustration that signals to each of the users that the video conference has effectively been established. In this particular example, and as reflected by 130, both displays may be illuminated in order to signify that the call is in session. Note that if the second user chooses to answer the call while he/she is using his/her display for other video purposes (e.g., a software application on a personal computer), then the video call takes over the display screen such that the application is minimized during the call. The second user may still share that application if he/she chooses (e.g., a software prompt, a physical button, etc.), but not necessarily as a default protocol (i.e., the second user needs to suitably authorize this sharing activity before the first individual would see the second user's current screen).

At 140, the camera associated with each of the displays may move from its respective housing into its appropriate position for capturing image data. The deployment of each camera may also indicate to each respective user that the video conference has been initiated. At 150, both users can see each other on their respective displays. An ensuing conversation can occur, where the parties may freely share documents and conduct any appropriate activities associated with video conferencing.

As shown in 160, at the conclusion of the call, both users may end the call by pressing some button (e.g., a software icon, a physical button on an IP Phone, etc.). At 170, the cameras associated with each display may be retracted into their respective housings. At approximately the same time, any illumination elements associated with the displays may be turned off to signify that the video conferencing has ended. Likewise, the retraction of each camera may indicate to each respective user that the video conference session has terminated.

Figure 6:
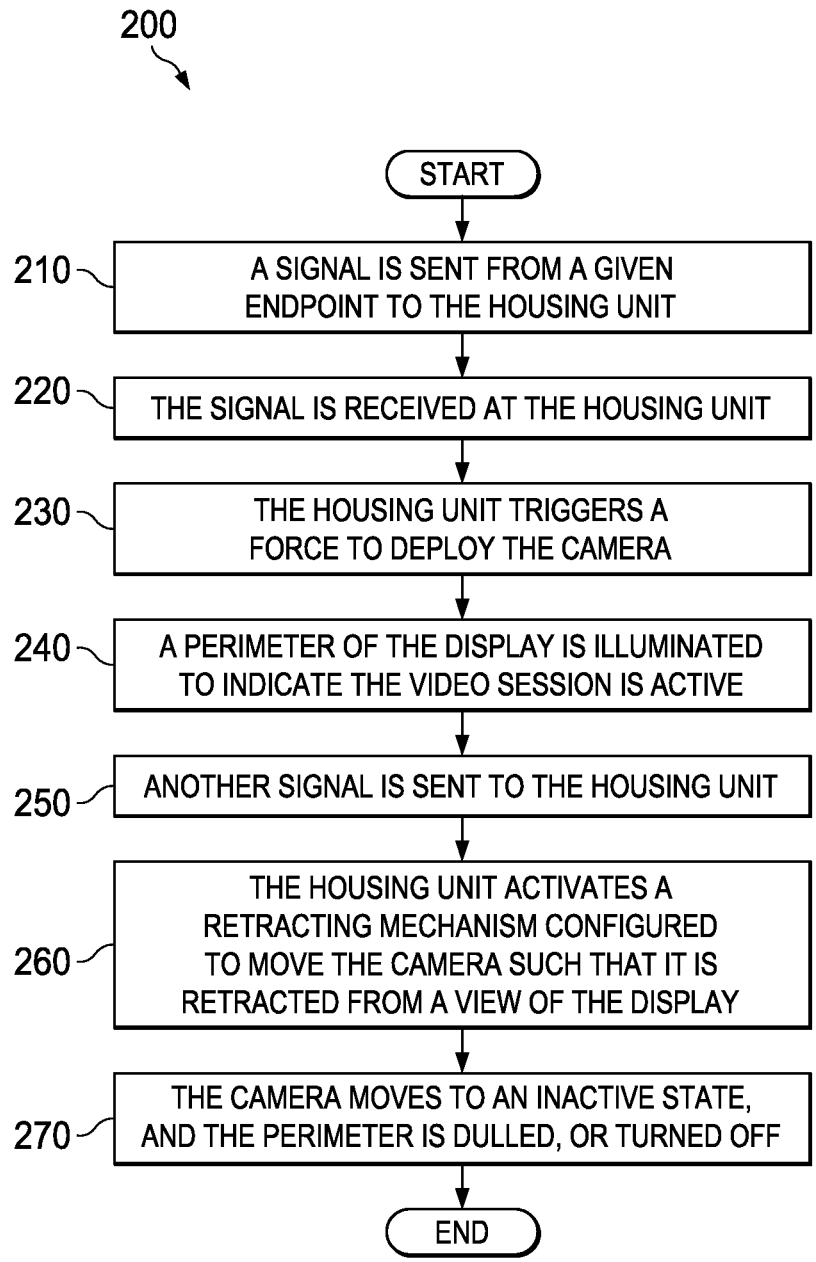

FIG. 6 is a simplified flowchart 200 illustrating one generic example operation associated with system 10. The flow begins at 210, where a signal is sent from a given endpoint (e.g., a remote control) to housing unit 12. At step 220 signal is received at housing unit 12, which reacts to the signal by triggering a force to deploy camera 20 (shown by operation 230). A perimeter of display 14 is illuminated at 240 to indicate the video session is active. At 250, another signal is sent to housing unit 12. At 260, housing unit 12 activates a retracting mechanism configured to move camera 20 such that it is retracted from a view of the display. Camera 20 moves to an inactive state at 270, and the perimeter is dulled, or turned off.

Note that in certain example implementations, the retracting functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element can store data used for the operations described herein. This includes the memory element (e.g., as shown in FIG. 4) being able to store software, logic, code, or processor instructions that are executed to carry out the activities described in this Specification. A processor (e.g., as shown in FIG. 4) can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, retracting mechanism 30, PCB 40 and/or housing unit 12 includes software (e.g., provisioned as retracting module 99*c*, and/or in any suitable location of PCB 40) in order to achieve the retracting/deployment functions outlined herein. These activities can be facilitated by motor controller 48. Additionally, each of these devices may include a processor that can execute software or an algorithm to perform the retracting/deployment activities, as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein (e.g., database, table, cache, key, etc.) should be construed as being encompassed within the broad term 'memory element.' Similarly, any of the potential processing elements, modules, and machines described in this Specification should be construed as being encompassed within the broad term 'processor.' Each of retracting mechanism 30, PCB 40, and/or housing unit 12 can also include suitable interfaces for receiving, transmitting, and/or otherwise communicating data or information in a network environment.

Note that with the example provided above, as well as numerous other examples provided herein, interaction may be described in terms of two or three components. However, this has been done for purposes of clarity and example only. In certain cases, it may be easier to describe one or more of the functionalities of a given set of flows by only referencing a limited number of components. It should be appreciated that system 10 (and its teachings) are readily scalable and can accommodate a large number of components, as well as more complicated/sophisticated arrangements and configurations. Accordingly, the examples provided should not limit the scope or inhibit the broad teachings of system 10 as potentially applied to a myriad of other architectures.

It is also important to note that the operations in the preceding flow diagrams illustrate only some of the possible video conferencing scenarios and patterns that may be executed by, or within, system 10. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 10 in that any suitable arrangements, chronologies, configurations, and timing mechanisms may be provided without departing from the teachings of the present disclosure.

For example, although camera 20 has been described as being mounted in a particular fashion, camera 20 could be mounted in any suitable manner in order to capture image data from an effective viewpoint. Other configurations could include suitable wall mountings, aisle mountings, furniture mountings, cabinet mountings, etc., or arrangements in which cameras would be appropriately spaced or positioned to perform its functions. Additionally, system 10 can have direct applicability in Telepresence environments (both large and small) such that quality image data can be collected during video sessions. Moreover, although system 10 has been illustrated with reference to particular elements and operations that facilitate the communication process, these elements and operations may be replaced by any suitable architecture or process that achieves the intended functionality of system 10.

What is claimed is:

1. A method, comprising:
   initiating a video session involving an end user, wherein a camera is configured to receive image data associated with the video session; and
   activating a retracting mechanism configured to move the camera such that the camera is retracted from a view of a display into a housing unit and the camera moves to an inactive state;
   wherein the display is configured to illuminate a portion of the display when the video session is initiated.

2. The method of claim 1, further comprising:
   activating the retracting mechanism such that the camera is moved to a position in the view of the display and the camera moves to an active state.

3. The method of claim 1, wherein the housing unit includes the retracting mechanism, which includes a motor configured to provide a retracting force to the camera.

4. The method of claim 1, wherein a motor control element signals a motor to provide a retracting force to the camera.

5. The method of claim 1, wherein the retracting mechanism includes a sensor configured to monitor a position of the camera.

6. The method of claim 1, wherein a wireless controlling element is configured to activate the retracting mechanism.

7. Logic encoded in one or more non-transitory tangible media that includes code for execution and when executed by a processor operable to perform operations comprising:
   initiating a video session involving an end user, wherein a camera is configured to receive image data associated with the video session; and
   activating a retracting mechanism configured to move the camera such that the camera is retracted from a view of a display into a housing unit and the camera moves to an inactive state:
   wherein the display is configured to illuminate a portion of the display when the video session is initiated.

8. The logic of claim 7, the operations further comprising:
   activating the retracting mechanism such that the camera is moved to a position in the view of the display and the camera moves to an active state.

9. The logic of claim 7, wherein a motor control element signals a motor to provide a retracting force to the camera.

10. The logic of claim 7, wherein the retracting mechanism includes a sensor configured to monitor a position of the camera.

11. The logic of claim 7, wherein a wireless controlling element is configured to activate the retracting mechanism.

12. An apparatus, comprising:
    a camera configured to receive image data associated with an end user involved in a video session; and
    a display configured to interface with the camera, wherein the camera and the display cooperate such that the apparatus is configured to;
    initiate the video session involving the end user; and
    activate a retracting mechanism configured to move the camera such that the camera is retracted from a view of the display into a housing unit and the camera moves to an inactive state;
    wherein the display is configured to illuminate a portion of the display when the video session is initiated.

13. The apparatus of claim 12, further comprising:
    the housing unit that includes the retracting mechanism, wherein the retracting mechanism includes a motor configured to provide a retracting force to the camera.

14. The apparatus of claim 12, wherein the apparatus is further configured to:
    activate the retracting mechanism such that the camera is moved to a position in the view of the display and the camera moves to an active state.

15. The apparatus of claim 12, wherein the display includes a perimeter configured to illuminate when the video session is initiated.

16. The apparatus of claim 12, further comprising:
    a motor control element configured to signal a motor to provide a retracting force to the camera, and wherein the retracting mechanism includes a sensor configured to monitor a position of the camera.

17. The apparatus of claim 12, further comprising:
    a controlling element configured to activate the retracting mechanism; and
    a retracting module configured to receive a wireless signal from the controlling element in order to activate the retracting mechanism.

18. The apparatus of claim 12, further comprising:
    a telescopic stand coupled to the display and configured to be adjusted in a horizontal plane such that the display moves in concert with adjustments to the telescopic stand.

* * * * *